United States Patent
Mann et al.

(10) Patent No.: US 9,740,194 B2
(45) Date of Patent: Aug. 22, 2017

(54) ABSTRACTED DISPLAY BUILDING METHOD AND SYSTEM

(75) Inventors: Krista Kummerfeldt Mann, Waukesha, WI (US); Robert F. Lloyd, Muskego, WI (US); Steven Mark Cisler, Franklin, WI (US); Clinton D. Britt, Milwaukee, WI (US); Joseph Francis Mann, Waukesha, WI (US)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 891 days.

(21) Appl. No.: 12/708,089

(22) Filed: Feb. 18, 2010

(65) Prior Publication Data

US 2010/0146418 A1    Jun. 10, 2010

Related U.S. Application Data

(63) Continuation of application No. 11/537,479, filed on Sep. 29, 2006, now abandoned, which is a
(Continued)

(51) Int. Cl.
*G06F 3/048* (2013.01)
*G05B 19/409* (2006.01)
(Continued)

(52) U.S. Cl.
CPC ........... *G05B 19/409* (2013.01); *G05B 15/00* (2013.01); *G05B 19/042* (2013.01);
(Continued)

(58) Field of Classification Search
CPC .... G05B 19/409; G05B 15/00; G05B 19/042; G05B 2219/2206; G05B 2219/24084;
(Continued)

(56) References Cited

U.S. PATENT DOCUMENTS

| 4,728,936 A | 3/1988 | Guscott et al. |
| 5,412,400 A | 5/1995 | Takahara et al. |

(Continued)

FOREIGN PATENT DOCUMENTS

| EP | 1 280 027 | 1/2003 |
| EP | 1 420 316 | 5/2004 |
| WO | 01/67192 A2 | 9/2001 |
| WO | WO0195041 | 12/2001 |
| WO | 2004/086160 A1 | 10/2004 |

OTHER PUBLICATIONS

PCT/US05/40293 PCT/IB/373 International Preliminary Report on Patentability. Last accessed Jul. 21, 2010, 1 page.
(Continued)

*Primary Examiner* — Patrick Riegler
(74) *Attorney, Agent, or Firm* — Amin, Turocy & Watson, LLP

(57) ABSTRACT

A machine can be accessed and controlled with the help of an interface device. The customizable interface device contains device elements that define features relating to the external representation and internal functionality of the interface device, as linked to one or more machines. An operator can use a configuration station to implement single or reoccurring queries that interact with the interface device and corresponding machines. In particular, the queries target the configuration of device elements in the interface device. The process can include temporarily unloading unused features from active memory and mirroring property changes initialized by a source. An emulator can assist in the configuration process by providing a preliminary software representation of the interface device hardware. A user can develop, test, and reconfigure functions on the emulator before loading the finalized platform to the interface device.

13 Claims, 13 Drawing Sheets

Related U.S. Application Data continuation-in-part of application No. 10/980,588, filed on Nov. 3, 2004, now abandoned, and a continuation-in-part of application No. 11/050,923, filed on Feb. 4, 2005, now Pat. No. 7,500,597, and a continuation-in-part of application No. 11/147,586, filed on Jun. 7, 2005, now abandoned, and a continuation-in-part of application No. 11/147,604, filed on Jun. 7, 2005, now Pat. No. 8,151,196, and a continuation-in-part of application No. 11/147,590, filed on Jun. 7, 2005, now Pat. No. 8,918,733, and a continuation-in-part of application No. 11/147,603, filed on Jun. 7, 2005, now Pat. No. 8,984,423, and a continuation-in-part of application No. 11/147,582, filed on Jun. 7, 2005, now Pat. No. 8,875,040, and a continuation-in-part of application No. 11/147,591, filed on Jun. 7, 2005, now Pat. No. 7,509,249, and a continuation-in-part of application No. 11/147,607, filed on Jun. 7, 2005, now Pat. No. 8,898,123, and a continuation-in-part of application No. 11/147,588, filed on Jun. 7, 2005, now Pat. No. 8,639,491, and a continuation-in-part of application No. 11/147,589, filed on Jun. 7, 2005, now Pat. No. 7,930,635.

(51) Int. Cl.
| | |
|---|---|
| *G06F 9/445* | (2006.01) |
| *G05B 19/042* | (2006.01) |
| *G06F 9/44* | (2006.01) |
| *H04L 29/08* | (2006.01) |
| *H04L 15/00* | (2006.01) |
| *G05B 15/00* | (2006.01) |

(52) U.S. Cl.
CPC ........ *G06F 9/4443* (2013.01); *G06F 9/44594* (2013.01); *H04L 15/00* (2013.01); *H04L 67/025* (2013.01); *G05B 2219/1205* (2013.01); *G05B 2219/2206* (2013.01); *G05B 2219/24084* (2013.01); *G05B 2219/25305* (2013.01); *G05B 2219/25428* (2013.01); *G05B 2219/31406* (2013.01); *G05B 2219/32142* (2013.01); *G05B 2219/34192* (2013.01); *G05B 2219/36138* (2013.01)

(58) Field of Classification Search
CPC ........... G05B 2219/25428; G05B 2219/32142; G05B 2219/36138; G06F 9/4443; G06F 9/44594; H04L 67/025; H04L 67/12
USPC ................................................. 715/810, 771
See application file for complete search history.

(56) References Cited

U.S. PATENT DOCUMENTS

| | | | |
|---|---|---|---|
| 5,805,442 A | 9/1998 | Crater et al. | |
| 5,903,455 A | 5/1999 | Sharpe et al. | |
| 5,911,070 A | 6/1999 | Solton et al. | |
| 5,950,006 A | 9/1999 | Crater et al. | |
| 5,975,737 A | 11/1999 | Crater et al. | |
| 5,982,362 A | 11/1999 | Crater et al. | |
| 5,997,167 A | 12/1999 | Crater et al. | |
| 6,119,247 A | 9/2000 | House et al. | |
| 6,138,140 A | 10/2000 | Yokote et al. | |
| 6,175,364 B1 | 1/2001 | Wong et al. | |
| 6,201,996 B1 | 3/2001 | Crater et al. | |
| 6,219,839 B1 | 4/2001 | Sampsell | |
| 6,363,398 B1 | 3/2002 | Andersen | |
| 6,418,214 B1 | 7/2002 | Smythe et al. | |
| 6,418,392 B1 | 7/2002 | Rust et al. | |
| 6,424,343 B1 | 7/2002 | Deering et al. | |
| 6,437,805 B1 | 8/2002 | Sojoodi et al. | |
| 6,486,893 B1 | 11/2002 | Ramchandani et al. | |
| 6,499,062 B1* | 12/2002 | Shteyn ........................ | 719/315 |
| 6,509,913 B2 | 1/2003 | Martin et al. | |
| 6,526,513 B1 | 2/2003 | Shrader et al. | |
| 6,556,950 B1 | 4/2003 | Schwenke et al. | |
| 6,559,773 B1 | 5/2003 | Berry | |
| 6,587,756 B2 | 7/2003 | Moriguchi et al. | |
| 6,618,854 B1 | 9/2003 | Mann | |
| 6,629,003 B1 | 9/2003 | Frizzell et al. | |
| 6,640,169 B2 | 10/2003 | Bergmann et al. | |
| 6,651,110 B1 | 11/2003 | Caspers et al. | |
| 6,664,979 B1 | 12/2003 | Schofield et al. | |
| 6,677,964 B1 | 1/2004 | Nason et al. | |
| 6,684,264 B1 | 1/2004 | Choi | |
| 6,725,032 B1 | 4/2004 | Sheridan et al. | |
| 6,732,191 B1 | 5/2004 | Baker et al. | |
| 6,851,621 B1 | 2/2005 | Wacker et al. | |
| 6,904,387 B2 | 6/2005 | Melzer | |
| 6,967,565 B2 | 11/2005 | Lingemann | |
| 7,013,351 B2 | 3/2006 | Bracewell et al. | |
| 7,017,116 B2 | 3/2006 | Elsbree et al. | |
| 7,017,124 B2 | 3/2006 | Jaeger | |
| 7,092,771 B2 | 8/2006 | Retlich et al. | |
| 7,096,465 B1 | 8/2006 | Dardinski et al. | |
| 7,099,809 B2 | 8/2006 | Dori | |
| 7,100,195 B1 | 8/2006 | Underwood | |
| 7,110,837 B2 | 9/2006 | Oka et al. | |
| 7,136,711 B1 | 11/2006 | Duncan et al. | |
| 7,149,747 B1 | 12/2006 | Cheng et al. | |
| 7,165,226 B2 | 1/2007 | Thurner et al. | |
| 7,209,949 B2 | 4/2007 | Mousseau et al. | |
| 7,216,298 B1 | 5/2007 | Ballard et al. | |
| 7,275,235 B2 | 9/2007 | Molinari et al. | |
| 7,305,114 B2 | 12/2007 | Wolff et al. | |
| 7,308,649 B2 | 12/2007 | Ehrich et al. | |
| 7,315,791 B2 | 1/2008 | Ilic et al. | |
| 7,337,409 B2 | 2/2008 | Doblmayr et al. | |
| 7,392,293 B2 | 6/2008 | Leonik et al. | |
| 7,409,569 B2 | 8/2008 | Illowsky et al. | |
| 7,418,669 B2 | 8/2008 | Melzer | |
| 7,500,597 B2 | 3/2009 | Mann et al. | |
| 7,509,249 B2 | 3/2009 | Britt et al. | |
| 7,554,544 B2 | 6/2009 | MacLaurin | |
| 7,555,706 B2 | 6/2009 | Chapman et al. | |
| 7,593,780 B2 | 9/2009 | Mann et al. | |
| 7,702,409 B2 | 4/2010 | Lucas et al. | |
| 7,729,789 B2 | 6/2010 | Blevins et al. | |
| 7,747,596 B2 | 6/2010 | Bigioi et al. | |
| 2001/0020291 A1* | 9/2001 | Kudukoli et al. ................. | 717/1 |
| 2001/0034879 A1 | 10/2001 | Washington et al. | |
| 2001/0047213 A1 | 11/2001 | Sepe, Jr. | |
| 2002/0007238 A1 | 1/2002 | Moriguchi et al. | |
| 2002/0015042 A1 | 2/2002 | Robotham et al. | |
| 2002/0030843 A1 | 3/2002 | Tuli | |
| 2002/0032761 A1 | 3/2002 | Aoyagi et al. | |
| 2002/0052933 A1 | 5/2002 | Leonhard et al. | |
| 2002/0054029 A1 | 5/2002 | Glancy et al. | |
| 2002/0055790 A1 | 5/2002 | Havekost | |
| 2002/0073061 A1* | 6/2002 | Collins ........................... | 707/1 |
| 2002/0109726 A1 | 8/2002 | Rogers et al. | |
| 2002/0129096 A1 | 9/2002 | Mansour et al. | |
| 2002/0138178 A1 | 9/2002 | Bergmann et al. | |
| 2002/0156926 A1 | 10/2002 | Batke et al. | |
| 2003/0023336 A1 | 1/2003 | Kreidler et al. | |
| 2003/0028269 A1 | 2/2003 | Spriggs et al. | |
| 2003/0041147 A1 | 2/2003 | van den Oord et al. | |
| 2003/0051074 A1 | 3/2003 | Edwards | |
| 2003/0097189 A1 | 5/2003 | Melzer | |
| 2003/0105535 A1 | 6/2003 | Rammler | |
| 2003/0105606 A1 | 6/2003 | Poley et al. | |
| 2003/0120397 A1 | 6/2003 | Bergmann et al. | |
| 2003/0139821 A1 | 7/2003 | Papadopoulos et al. | |
| 2003/0149749 A1 | 8/2003 | Carlucci et al. | |
| 2003/0167265 A1* | 9/2003 | Corynen ........................ | 707/4 |
| 2003/0221004 A1* | 11/2003 | Stupek et al. ................. | 709/224 |
| 2003/0229900 A1 | 12/2003 | Reisman | |
| 2003/0233637 A1 | 12/2003 | Martin | |
| 2004/0021679 A1 | 2/2004 | Chapman et al. | |

(56) References Cited

U.S. PATENT DOCUMENTS

| | | | |
|---|---|---|---|
| 2004/0044953 A1 | 3/2004 | Watkins et al. | |
| 2004/0068749 A1 | 4/2004 | Crater et al. | |
| 2004/0098148 A1 | 5/2004 | Retlich et al. | |
| 2004/0133853 A1 | 7/2004 | Poerner et al. | |
| 2004/0139085 A1 | 7/2004 | Eryurek et al. | |
| 2004/0139385 A1 | 7/2004 | Sakaue | |
| 2004/0153493 A1 | 8/2004 | Slavin et al. | |
| 2004/0228275 A1* | 11/2004 | Costo et al. | 370/230 |
| 2004/0230328 A1 | 11/2004 | Armstrong et al. | |
| 2004/0237049 A1 | 11/2004 | Pletcher et al. | |
| 2004/0249903 A1 | 12/2004 | Ha et al. | |
| 2005/0021158 A1 | 1/2005 | De Meyer et al. | |
| 2005/0027841 A1 | 2/2005 | Rolfe | |
| 2005/0055646 A1 | 3/2005 | Melzer | |
| 2005/0066285 A1* | 3/2005 | Santori et al. | 715/763 |
| 2005/0155043 A1 | 7/2005 | Schulz et al. | |
| 2005/0190768 A1 | 9/2005 | Cutler | |
| 2005/0216865 A1 | 9/2005 | Rollin et al. | |
| 2006/0036992 A1 | 2/2006 | Hayles et al. | |
| 2006/0117295 A1 | 6/2006 | Wu et al. | |
| 2006/0167991 A1* | 7/2006 | Heikes et al. | 709/204 |
| 2006/0218506 A1* | 9/2006 | Srenger et al. | 715/810 |
| 2006/0221380 A1 | 10/2006 | Pretz et al. | |
| 2006/0236266 A1* | 10/2006 | Majava | 715/810 |
| 2006/0270661 A1* | 11/2006 | Liu et al. | 514/220 |
| 2006/0277027 A1 | 12/2006 | Mann et al. | |
| 2006/0277194 A1 | 12/2006 | Britt et al. | |
| 2006/0277498 A1 | 12/2006 | Mann et al. | |
| 2007/0002036 A1* | 1/2007 | Kardach et al. | 345/213 |
| 2007/0033538 A1 | 2/2007 | Mann et al. | |
| 2007/0038341 A1 | 2/2007 | Rieger et al. | |
| 2007/0055385 A1 | 3/2007 | Mann et al. | |
| 2007/0109724 A1 | 5/2007 | Kurita | |
| 2007/0179641 A1 | 8/2007 | Lucas et al. | |
| 2007/0204047 A1* | 8/2007 | Parker et al. | 709/227 |
| 2009/0204963 A1* | 8/2009 | Swart et al. | 718/1 |
| 2010/0107108 A1* | 4/2010 | Husoy et al. | 715/777 |
| 2010/0146418 A1 | 6/2010 | Mann et al. | |

OTHER PUBLICATIONS

Lacroix, et al. Web Technologies in Support of Virtual Manufacturing Environments. In: Proceedings of Emerging Technologies and Factory Automation, 2003, IEEE Conference, vol. 2, Sep. 16-19, 2003, Piscataway, pp. 43-49. Last accessed Jul. 27, 2009, 7 pages.
Class Component, Apr. 6, 2004, 85 pages.
OA dated Mar. 28, 2008 for U.S. Appl. No. 11/050,923, 10 pages.
OA dated Jan. 28, 2008 for U.S. Appl. No. 10/980,588, 18 pages.
OA dated Apr. 17, 2009 for U.S. Appl. No. 10/980,588, 20 pages.
OA dated Jun. 29, 2007 for U.S. Appl. No. 10/980,588, 17 pages.
OA dated Jan. 8, 2008 for U.S. Appl. No. 11/147,586, 20 pages.
OA dated Jul. 21, 2008 for U.S. Appl. No. 11/147,586, 23 pages.
OA dated Mar. 17, 2008 for U.S. Appl. No. 11/147,604, 18 pages.
OA dated Oct. 17, 2008 for U.S. Appl. No. 11/147,604, 16 pages.
OA dated Mar. 18, 2009 for U.S. Appl. No. 11/147,604, 14 pages.
OA dated Oct. 6, 2009 for U.S. Appl. No. 11/147,604, 20 pages.
OA dated Sep. 26, 2008 for U.S. Appl. No. 11/147,590, 24 pages.
OA dated May 14, 2009 for U.S. Appl. No. 11/147,590, 30 pages.
OA dated Dec. 9, 2009 for U.S. Appl. No. 11/147,590, 29 pages.
OA dated Dec. 13, 2007 for U.S. Appl. No. 11/147,603, 18 pages.
OA dated Jun. 12, 2007 for U.S. Appl. No. 11/147,603, 31 pages.
OA dated Feb. 19, 2009 for U.S. Appl. No. 11/147,603, 22 pages.
OA dated Aug. 6, 2009 for U.S. Appl. No. 11/147,603, 21 pages.
OA dated Mar. 18, 2008 for U.S. Appl. No. 11/147,582, 48 pages.
OA dated Oct. 28, 2008 for U.S. Appl. No. 11/147,582, 26 pages.
OA dated Mar. 6, 2009 for U.S. Appl. No. 11/147,582, 23 pages.
OA dated Sep. 3, 2009 for U.S. Appl. No. 11/147,582, 24 pages.
OA dated Mar. 25, 2008 for U.S. Appl. No. 11/147,591, 13 pages.
OA dated Apr. 24, 2008 for U.S. Appl. No. 11/147,607, 100 pages.
OA dated Oct. 27, 2008 for U.S. Appl. No. 11/147,607, 17 pages.
OA dated Apr. 29, 2009 for U.S. Appl. No. 11/147,607, 15 pages.
OA dated Nov. 13, 2009 for U.S. Appl. No. 11/147,607, 29 pages.
OA dated Jan. 11, 2008 for U.S. Appl. No. 11/147,588, 16 pages.
OA dated Jul. 11, 2008 for U.S. Appl. No. 11/147,588, 19 pages.
OA dated Jan. 23, 2009 for U.S. Appl. No. 11/147,588, 15 pages.
OA dated Jul. 21, 2009 for U.S. Appl. No. 11/147,588, 16 pages.
OA dated May 16, 2008 for U.S. Appl. No. 11/147,589, 12 pages.
OA dated Nov. 13, 2008 for U.S. Appl. No. 11/147,589, 12 pages.
OA dated Apr. 28, 2009 for U.S. Appl. No. 11/147,589, 16 pages.
OA dated Nov. 19, 2009 for U.S. Appl. No. 11/147,589, 22 pages.
OA dated Oct. 3, 2007 for U.S. Appl. No. 11/537,445, 8 pages.
OA dated Sep. 5, 2008 for U.S. Appl. No. 11/537,419, 24 pages.
OA dated Dec. 19, 2008 for U.S. Appl. No. 11/537,419, 31 pages.
OA dated Mar. 10, 2009 for U.S. Appl. No. 11/537,419, 39 pages.
OA dated Sep. 23, 2009 for U.S. Appl. No. 11/537,419, 43 pages.
OA dated Mar. 26, 2010 for U.S. Appl. No. 10/980,588, 23 pages.
OA dated Jun. 24, 2010 for U.S. Appl. No. 11/147,590, 43 pages.
Dana Nourie. Building an Application: Part 1: Application Objects, Oct. 2001. http://java.coe.psu.ac.th/SunDocuments/BuildingAnApplication/part1.pdf, last accessed Jul. 21, 2010, 5 pages.
OA dated Feb. 3, 2010 for U.S. Appl. No. 11/147,603, 21 pages.
OA dated Jul. 7, 2010 for U.S. Appl. No. 11/147,603, 20 pages.
OA dated Jul. 16, 2010 for U.S. Appl. No. 11/147,607, 27 pages.
Office Action dated Dec. 21, 2010 for U.S. Appl. No. 11/147,590, 65 pages.
Office Action dated Dec. 14, 2010 for U.S. Appl. No. 11/147,603, 21 pages.
Office Action dated Jun. 9, 2011 for U.S. Appl. No. 11/147,604, 27 pages.
Office Action dated Dec. 27, 2010 for U.S. Appl. No. 11/147,604, 20 pages.
Office Action dated Oct. 18, 2010 for U.S. Appl. No. 11/147,582, 20 pages.
Office Action dated Sep. 28, 2010 for U.S. Appl. No. 11/147,607, 31 pages.
Notice of Allowance dated Dec. 21, 2010 for U.S. Appl. No. 11/147,589, 13 pages.
EP Search Report dated Dec. 20, 2010 for EP application No. 10013275.2, 5 pages.
EP Office Action dated Mar. 20, 2012 for EP application No. 10013275.2, 5 pages.
EP Office Action dated Dec. 14, 2010 for EP application No. 06011756.1, 4 pages.
EP Office Action dated Mar. 20, 2012 for EP application No. 06011756.1, 5 pages.
Office Action dated Sep. 30, 2008 for U.S. Appl. No. 11/537,479, 27 pages.
Office Action dated Apr. 30, 2009 for U.S. Appl. No. 11/537,479, 35 pages.
Office Action dated Sep. 5, 2008 for U.S. Appl. No. 11/537,419, 24 pages.
Office Action dated Dec. 19, 2008 for U.S. Appl. No. 11/537,419, 31 pages.
Office Action dated May 10, 2009 for U.S. Appl. No. 11/537,419, 38 pages.
Office Action dated Nov. 23, 2009 for U.S. Appl. No. 11/537,479, 65 pages.
Office Action dated Jan. 4, 2013 for U.S. Appl. No. 11/147,586, 30 pages.
Office Action dated Apr. 30, 2010 for U.S. Appl. No. 11/147,582, 19 pages.
Office Action dated Nov. 27, 2009 for U.S. Appl. No. 10/980,588, 19 pages.
Office Action dated Jan. 6, 2014 for U.S. Appl. No. 10/980,588, 28 pages.
Office Action dated Nov. 7, 2013 for U.S. Appl. No. 11/147,586, 33 pages.

* cited by examiner

ABSTRACTED DISPLAY BUILDING METHOD AND SYSTEM

CROSS-REFERENCE TO RELATED APPLICATIONS

This application is a continuation of U.S. patent application Ser. No. 11/537,479, filed Sep. 29, 2006, entitled, "ABSTRACTED DISPLAY BUILDING METHOD AND SYSTEM", which is a continuation-in-part of U.S. patent application Ser. No. 10/980,588, filed Nov. 3, 2004, entitled, "HMI RECONFIGURATION METHOD AND SYSTEM", U.S. patent application Ser. No. 11/050,923, filed Feb. 4, 2005, entitled, "CONFIGURABLE INTERFACE CONFIGURATION METHOD AND SYSTEM USING A REMOTE INTERFACE", U.S. patent application Ser. No. 11/147,586, filed Jun. 7, 2005, entitled, "REAL TIME PARALLEL INTERFACE CONFIGURATION AND DEVICE REPRESENTATION METHOD AND SYSTEM", U.S. patent application Ser. No. 11/147,604, filed Jun. 7, 2005, entitled, "ABSTRACTED DISPLAY BUILDING METHOD AND SYSTEM", U.S. patent application Ser. No. 11/147,590, filed Jun. 7, 2005, entitled, "ENHANCED SPEED INTERFACE METHOD AND SYSTEM", U.S. patent application Ser. No. 11/147,603, filed Jun. 7, 2005, entitled, "DYNAMIC REPRESENTATION OF COMPONENT CONFIGURATION METHOD AND SYSTEM", U.S. patent application Ser. No. 11/147,582, filed Jun. 7, 2005, entitled, "UNIVERSAL WEB-BASED REPROGRAMMING METHOD AND SYSTEM", U.S. patent application Ser. No. 11/147,591, filed Jun. 7, 2005, entitled, "EVENT-DRIVEN COMPONENT MIRRORING METHOD AND SYSTEM", U.S. patent application Ser. No. 11/147,607, filed Jun. 7, 2005, entitled, "METHOD AND SYSTEM FOR INTERFACE CONFIGURATION VIA DEVICE-SIDE SCRIPTING", U.S. patent application Ser. No. 11/147,588, filed Jun. 7, 2005, entitled, "EMULATOR FOR GENERAL PURPOSE VIEWER CONFIGURABLE INTERFACE", and U.S. patent application Ser. No. 11/147,589, filed Jun. 7, 2005, entitled, "RELEGENDABLE INTERFACE DEVICE DESIGN-TIME ENVIRONMENT SYSTEM AND METHOD". The entireties of the aforementioned applications are incorporated herein by reference.

TECHNICAL FIELD

The subject invention relates generally to interface devices, and more particularly to the configuration of such interface devices to effectively manage industrial control systems.

BACKGROUND

Factories that utilize machines to produce products depend on reliable industrial control systems. Machines can be responsible for building, refining, and testing various objects. The machines themselves may also require regular or sporadic monitoring, maintenance, adjustment, management, testing, and repair. Skilled workers may be allowed to turn off a machine to complete a task or be required to work on the machine as it is running. However, such equipment can expose individuals to dangerous conditions. Those who work directly with machines usually have to wear protective clothing to minimize impact of potential injuries from accidents. In addition, workers need to adapt to the operating environment of the machines. For example, if specific products or machines operate in a low temperature environment, the workers on the production floor have no choice but to endure the cold. This can be uncomfortable or inconvenient for the workers.

Likewise, people working with such equipment can expose manufactured products to contamination. Hair, dirt, oil, and germs from humans may damage certain highly sensitive products. Protective clothing therefore must protect not only the person from injuries, but also the machine from contamination through human contact. Unfortunately, such precautions are not always sufficient to guard against these risks. For example, time and resources are often wasted to discard unrecoverable products in order to maintain quality control standards.

Interface devices provide a safe intermediate link between operators and machines. The employment of interface devices allows people to monitor and control equipment without working in immediate physical proximity of the machines. While interface devices are useful because operators can maintain a distance from the machines for safety and quality concerns, interface devices also enable operators to work on machines without being in their direct view (e.g., machines that are enclosed in a case or that reside in another room). Operators depend on the accuracy, convenience, and ease of use of interface devices. It is therefore beneficial that interface devices be as versatile, efficient, and reliable as possible.

SUMMARY

The following presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description that is presented later.

An industrial automation setting includes an operator that interacts with a machine via a customizable interface device and corresponding configuration station. The customizable interface device can be configured in a unique manner that is more efficient and personalized over conventional interface devices. Settings may be implemented that dictate when and how configuration takes place, supporting seamless operation during configuration. Within an interface device, device elements (also referred to as control objects) are software components that define features of the device, such as properties, methods, connections, and communications interfaces. Together, the device elements represent most if not all aspects of the interface device and can be configured or reconfigured through remote or direct access.

A configuration station is a tool used by an operator to access the interface device, as well as send commands to the machine it is linked to. A user can interact with the interface device via a configuration station by setting up queries for single or recurring processes. The device elements can be reconfigured in the configuration station (by first uploading the device elements from the interface device to the configuration station) or directly in the interface device (through local or remote access). When device elements are reconfigured without first being uploaded to the configuration station, the interface device can switch between a development environment (to support a configuration mode) and an operational environment (to support an execution mode). At times, it may be preferable for the interface device not to switch between environments, and in those situations the interface device may be configured to accommodate changes while remaining in an operational environment.

The device elements can reside in their respective interface devices. In another configuration, some device elements can be located in the interface device and other device elements located at a remote location. Different interface devices can efficiently share device elements that are housed in a central remote location. One feature of interface devices is the ability to alter their appearances to suit a user's preferences. Not only can visual templates be customizable, they can be saved and sent to other interface devices. Furthermore, a single interface device can switch among various visual templates to easily serve the specific needs of multiple users.

Additional aspects of interface devices provide for conserving memory and optimizing overall efficiency. One approach supports temporarily unloading unused features from active memory until they are needed again. Another approach targets device element mirroring for property changes. Rather than waste network resources to transmit redundant information, an identical or related device element can mirror a change of another device element. To further conserve resources, users can enlist the help of an emulator to mimic the configuration of an interface device without a dependence on such additional hardware means of an extra interface device. Any development or customization can occur on the emulator as a convenient testing base to view and implement new functions through the customization of a user application file. The user application file can be perfected before it is downloaded to hardware (e.g., an interface device).

To the accomplishment of the foregoing and related ends, certain illustrative aspects of embodiments are described herein in connection with the following description and the annexed drawings. These aspects are indicative, however, of but a few of the various ways in which the principles of the subject matter may be employed, and the subject matter is intended to include all such aspects and their equivalents. Other advantages and novel features of the subject matter may become apparent from the following detailed description when considered in conjunction with the drawings.

DETAILED DESCRIPTION

Figure 1:
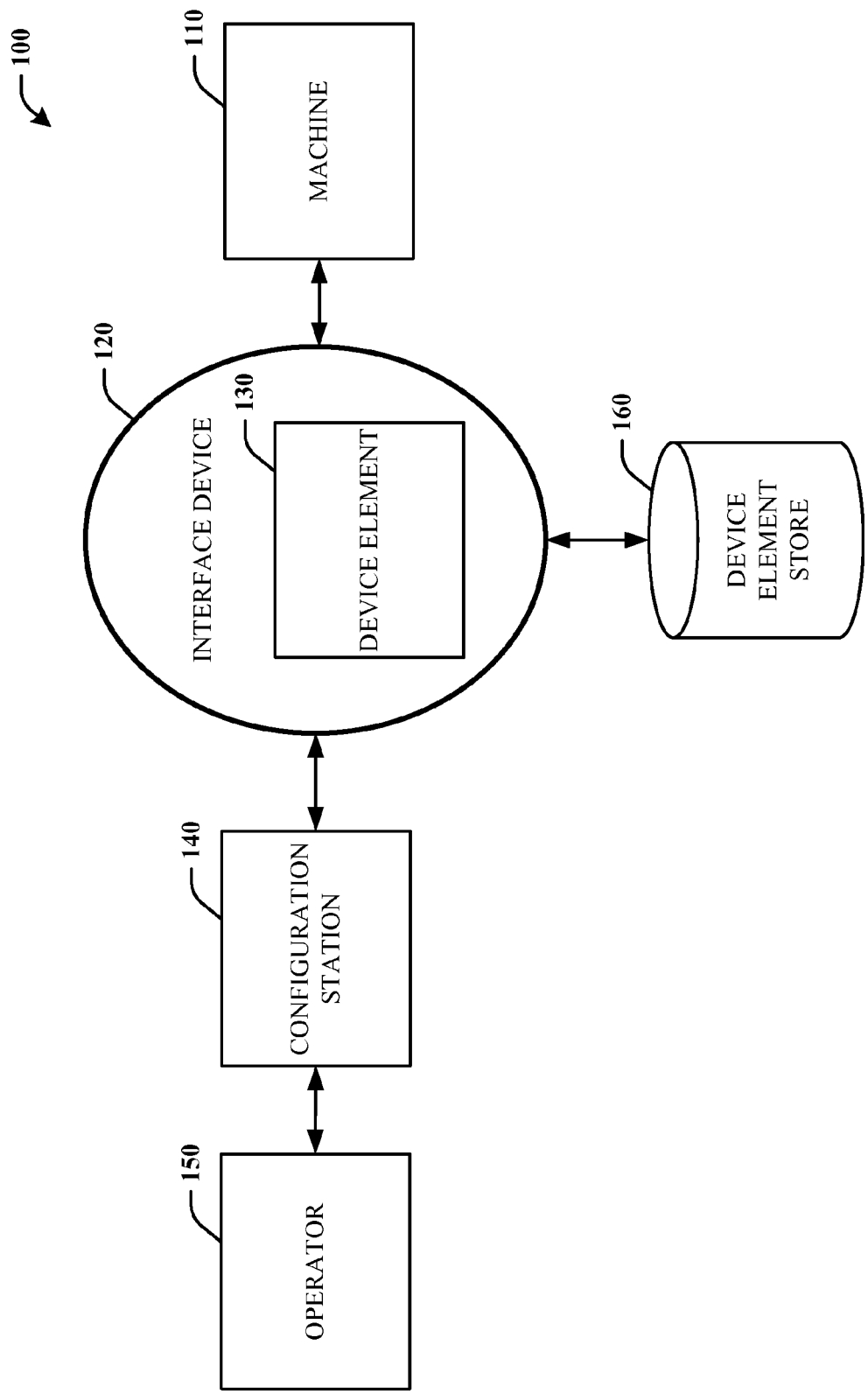
FIG. 1 is a block diagram of an industrial control system.

The subject matter is now described with reference to the drawings, wherein like reference numerals are used to refer to like elements throughout. In the following description, for purposes of explanation, numerous specific details are set forth in order to provide a thorough understanding of the subject matter. It may be evident, however, that subject matter embodiments may be practiced without these specific details. In other instances, well-known structures and devices are illustrated in block diagram form in order to facilitate describing the embodiments.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a computer component. One or more components may reside within a process and/or thread of execution and a component may be localized on one computer and/or distributed between two or more computers.

To provide general context, the run-time environment includes or provides access to device elements. The device elements are software components that may include any accessible or configurable element in a software environment. For example, the device elements include software components, such as "ActiveX" controls or ".NET" components that are managed by the run-time environment. "ActiveX" and ".NET" refer to object-oriented concepts, technologies and tools. Those skilled in the art will be well acquainted with such programming approaches generally. In the present context, such standards should be taken as merely examples, and "device elements" should be understood as including any generally similar components or self-sufficient programs that can be run as quasi-independent elements, sometimes referred to as "objects". Other standards and platforms exist for such elements, typically championed by different companies or industry groups.

Because such device elements are basic to certain of the inventive concepts, a few words of introduction are in order. Device elements generally include four features: properties, methods, connections (or connection points) and communications interfaces. Properties are attributes that can be adjusted, such as to define an image or representation of the element in a screen view, as well as its location on the screen, and so forth. A method is an executable function (sometimes referred to herein as the elements "functionality" or "state engine"), and defines an operation performed by execution of the element. A connection is a link between elements, and can be used to cause data (read from a memory or written to a memory) to be sent to another element.

Specific examples of device elements may include software pushbuttons, timers, gauges, PLC communication servers, screens, and applications. In general, virtually any identifiable function may be configured as such an element. Moreover, as discussed below, such elements may communicate with one another to perform a wide range of display, monitoring operations and control functions. It should be noted that device elements do not require special limitations for supporting a design mode. Also, while elements associated with an image are quite useful, particularly for screen views, many elements may not have a visual representation, but may perform functions within an HMI, such as calculations, or even management and data exchange between other elements.

In FIG. 1, a block diagram of an industrial control system 100 that facilitates indirect control of a machine is depicted. The industrial control system 100 comprises an interface device 120 and configuration station 140 that together provide a working link between an operator 150 and a machine 110. The interface device 120 is fully configurable in terms of visual and operational functionalities, providing for a flexible, efficient, and user-friendly tool. In addition, the manner in which configuration proceeds is also flexible, such as through real time configuration in a plurality of operating states. Examples of such an interface device include a human-machine interface (HMI), man-machine interface (MMI), graphical user interface (GUI), user interface (UI), and an operator interface (OI). The interface device 120 (along with the operator 150) can be located in a close physical proximity to the machine or can be located at a considerable distance from the machine, allowing the operator to completely and effectively interact with the machine as if he was working directly on the equipment. The interface device 120 houses at least one device element 130 that defines features relating to the interface device 120 or the machine 110. For example, device elements can define properties (e.g., adjustable attributes, such as the image representation of an element on a screen), methods (e.g., executable functions that define the operation performed by the element), connections (e.g., links that enable data to be exchanged among separated elements), and communications interfaces (e.g., the setup that enables communications to occur) of an interface device and can include software pushbuttons, timers, gauges, PLC communication servers, screens, and applications for their corresponding machines. A particular example of a device element 130 is a temperature gauge that records temperature of the machine 110.

The operator 150 can be a person, group of individuals, entity, program, or artificial intelligence unit that is mainly responsible for at least initial setup and direction of the machine 110, along with regularly monitoring the machine 110. The operator 150 employs the configuration station 140 as a tool to access device elements 130 in the interface device 120. When the operator 150 desires to measure, observe, test, extract, or alter something on the machine 110 or interface device 120, the operator 150 can generate a query by way of the configuration station 140. The configuration station 140 can proceed in various ways.

A configuration station may control one or more interface devices at once. The configuration station 140 can be integrated with the interface device or it can function as stand-alone tool. In one example, an operator can use a configuration station to develop appearance and organization of the interface device. In another example, the operator can use a configuration station to set up a continuous monitoring tool to detect high levels of contamination exposed to the machine in a cleansing phase of the production process. With respect to reconfiguration procedure, the configuration station 140 can upload the necessary device element(s) 130 from the interface device 120 to the configuration station 140, reconfigure the device element 130 in the configuration station 140, and download the reconfigured device element 130 back to the interface device 120. As an alternative, the configuration station 140 may reconfigure the device element 130 directly in the interface device 120 (where uploading the device element 130 to the configuration station 140 is unnecessary). This technique eliminates the need for a special program to retrieve and store the code, since the changes are made directly in the environment of the interface device. Furthermore, additional external code is not required to accomplish the necessary editing operations.

For this type of reconfiguration, the interface device 120 can switch between a development environment (to support a configuration mode) and an operational environment (to support an execution mode). While the interface device 120 is operating in a development environment, a parallel visual representation (e.g., in the form of a JPEG file, or any suitable static or sub-static representation) of the device elements can remain on the interface device (and refreshed when appropriate) as viewed by a user to minimize impact of obvious interruptions in operation. To accomplish this view, relevant elements are queried to extract respective image(s) or equivalent visual representation(s) and stored in a virtual frame buffer or memory display context. This content can be displayed on a general purpose viewer or browser while the interface device 120 is being configured in a development environment.

However, the configuration station 140 may reconfigure the device element 130 in the interface device 120 while the interface device 120 remains in execution mode so as to not interrupt operation of the machine 110. As certain device elements are actively running a process, other device elements may be edited. When configuration of those device elements is complete, they may be activated as soon as they become available or upon predetermined times (e.g., according to a refresh rate)—effectively achieving seamless operation of a continuous process. In an example, during a semiconductor heating process, an engineer may decide to increase the frequency in which the temperature reading is transmitted. Since it is inefficient to stop production of the batch in order to change that setting, the interface device supports reconfiguration during execution. As a result, the temperature is read more often, starting at the next wafer, once the setting is finalized, thus avoiding interruption of the process. Regardless of which environment is used for reconfiguration, such reconfiguration of device elements is not dependent on their prior configuration. The configuration station 140 does not utilize or require any prior knowledge of the nature, function, and properties of the device elements. Thus, specialized customization of the reconfiguration tool is not necessary.

Depending on the ability and resources of the interface device 120, the particular situation, and the needs of the operator 150, the configuration station 140 may select the most appropriate approach for a particular query. For instance, where a complete and thorough reconfiguration of multiple device elements is required, it may be more effective for the interface device 120 to switch to a development environment while the configuration station 140 is implementing the reconfiguration process. In another situation, where a simple reconfiguration that only affects one device element is required, if may be more efficient for the configuration station 140 to directly access that device element while the rest of the interface device 120 continues uninterrupted execution of its regular procedure.

In appropriate situations, the configuration station 140 may not be required. The operator 150 can create a query that self-generates reoccurring processes. In that case, the interface device 120 essentially creates its own commands, tests, and adjustments without need for constant monitoring or individualized queries.

In addition, the interface device 120 can access an external device element store 160 for device elements with additional features not found on the interface device 120. The device element store 160 can be available to a select group of interface devices or it can have open availability. The device element store 160 enables different machines to efficiently have access to a wide range of device elements. If necessary, the interface device 120 can optionally reach more than one device element store.

The interface device 120 relays and implements the corresponding controls, as specified by the operator 150, to the machine 110. The information communicated between the interface device 120 and machine 110 may be related to functions that monitor (e.g., a command to record the temperature of a particular chamber of the machine 110 at a certain time) or alter (e.g., a command to rotate a robotic arm of the machine 110 to a different chamber) the machine 110. The setup can be a single or repetitive function, dependent on various constraints. One example of a single function is a process for the purpose of testing or troubleshooting an aspect of the machine 110. An example of a repetitive function is a process that measures temperature of a chamber of the machine 110 at one-hour intervals (e.g., a time-based constraint), or turns off the heating mechanism once the temperature reaches a predetermined point (e.g., an event-based constraint).

It is to be appreciated that embodiments described herein can employ various artificial intelligence-based schemes for carrying out various aspects thereof. For example, control of a configuration station can involve using an automatic classifier system and process. The classifiers can be employed to determine and/or infer a need for changing settings of the interface device, as well as assisting with when and how to implement those changes. The classifiers can also apply a utility-based analysis that considers the cost associated with implementing the wrong setting against the cost of time and resources for manual operation. Moreover, current user state (e.g., amount of free time, urgency, need for accuracy, user frustration, display device capabilities . . . ) can be considered in connection with recognition in accordance with the embodiments described herein.

A classifier is a function that maps an input attribute vector, X=(x1, x2, x3, x4, . . . xn), to a confidence that the input belongs to a class, that is, f(X)=confidence (class). Such classification can employ a probabilistic and/or statistical-based analysis (for example, factoring into the analysis utilities and costs) to prognose or infer an action that a user desires to be automatically performed (e.g., implement a change to the interface device through the configuration station).

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to, training data. Other directed and undirected model classification approaches include, e.g., naïve Bayes, Bayesian networks, decision trees, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (such as by generic training data) as well as implicitly trained (such as by observing user behavior and/or receiving extrinsic information). For example, SVM's are configured by a learning or training phase within a classifier constructor and feature selection module. Thus, the classifier(s) can be used to automatically perform a number of functions as described herein. Accordingly, the operator 150 can optionally employ classifiers in connection with effecting the functionalities associated therewith.

Figure 2:
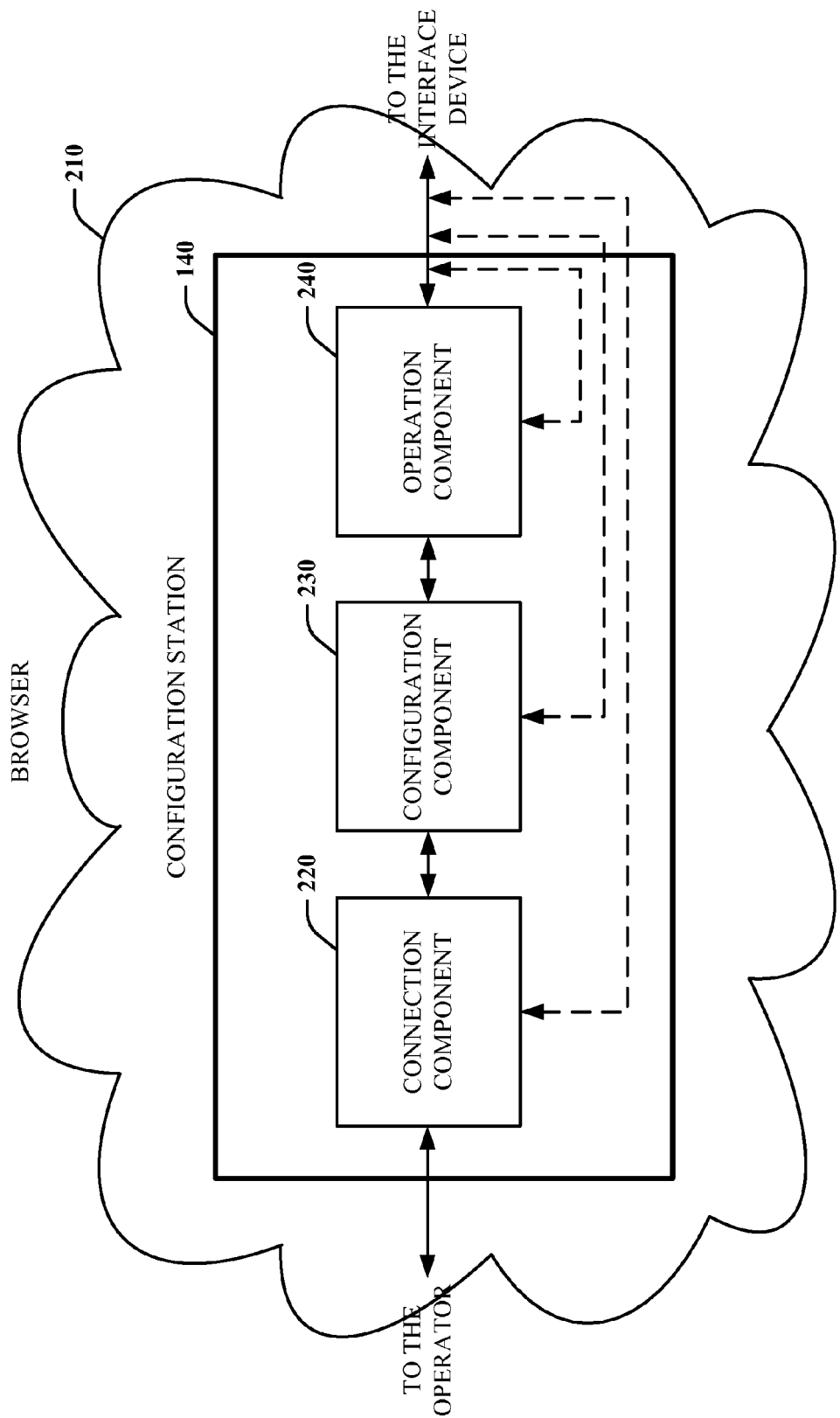
FIG. 2 is a block diagram of a configuration station.

Referring to FIG. 2, a block diagram of a configuration station 140 that facilitates flexible interaction between an operator and an interface device is illustrated. Not only can the configuration station 140 respond to direct instructions from an operator, the configuration station 140 may dynamically alter settings based on preferences, past behavior, and capabilities of the device and surrounding environment. For example, the configuration station may automatically optimize brightness and contrast of a screen view based on the current level of light. In another example, the configuration station may alter the amount of information displayed on a screen view based on the limitations of the displaying device (e.g., by reducing the amount of information displayed for a small screen or limited memory device). The configuration station 140 comprises a connection component 220 that establishes a working connection between the configuration station and the interface device, a configuration component 230 that facilitates the configuration of the interface device, and an operation component 240 that implements such configuration on the interface device. The configuration station 140 may supply direct access between an operator and an interface device through a cable or other physical connection. In addition, the configuration station 140 may also be housed in a browser 210 to provide remote access to one or more operators and one or more interface devices through an Internet or intranet connection.

The operator initiates configuration by sending a query to the configuration station 140. This signals the connection component 220 to establish a connection between the configuration station 140 and the interface device (as well as corresponding device elements residing on the interface device and device elements linked to the interface device). Upon verification that such connection has been established, the configuration component 230 selects the appropriate device elements to develop an interface screen for the interface device. The configuration component 230 may need to modify some device elements for them to be properly implemented. A resulting user-friendly interface screen accommodates the operator. The operation component 240 implements the interface screen onto the interface device. The interface screen may be displayed on the interface device itself, or on an application linked to the interface device. The interface screen displays functions and options that are altered by the operator via the device elements.

In addition, the interface screen can be customized as a template structure. Such template can be saved and sent to other interface devices, as well as automatically generated according to specific roles, profiles, and historical data. In one instance, a set of identical machines may operate on a production floor. Each machine may have its own interface screen that could be individually customized. However, having identical or consistent interface screens for all the machines greatly enhances the comfort of the operator because the operator would not need to readjust his thought process each time he works on a particular machine to familiarize himself with a different screen. When the operator determines one interface screen template, that template can be saved and implemented onto other interface devices without repeating the customization process. An interface device can switch among multiple saved interface screens, and thus is adaptable for a variety of users. Furthermore, generation of templates can occur with explicit or implicit training, using various classifiers. Through explicit training, a user sets forth the particular configuration scheme with detailed commands. Through implicit training, the system monitors and evaluates behavior of the operator, interface device, and machine, and intelligently implements changes for more convenient and efficient operation.

It is to be appreciated that various aspects described herein can be automated (e.g., through employment of artificial intelligence). Accordingly, automated action can be performed in connection with implementing one or more functionalities. The action can be triggered for example based on user and/or computing state, environment, preferences, tasks at hand, goals, historical information, and other extrinsic information. Moreover, a utility-based analysis can be employed in connection with such automated action where for example the cost of taking an incorrect or undesired automated action is factored against the benefit of taking a correct or desired automated action. In connection with the discussion supra related to training classifiers, such classifiers can be implicitly and/or explicitly trained in connection with taking automated action.

The configuration station 140 can be housed within a browser 210. Through a browser 210, the configuration station 140 can be functionally connected to, but physically apart from, the interface device. For instance, when a technician has an urgent problem, he may contact an engineer. Instead of troubleshooting the problem on the production floor, the engineer may access the configuration station 140 through an intranet connection from his cubicle office. Moreover, the engineer can also access the configuration station 140 from his home computer, using the Internet.

Figure 3:
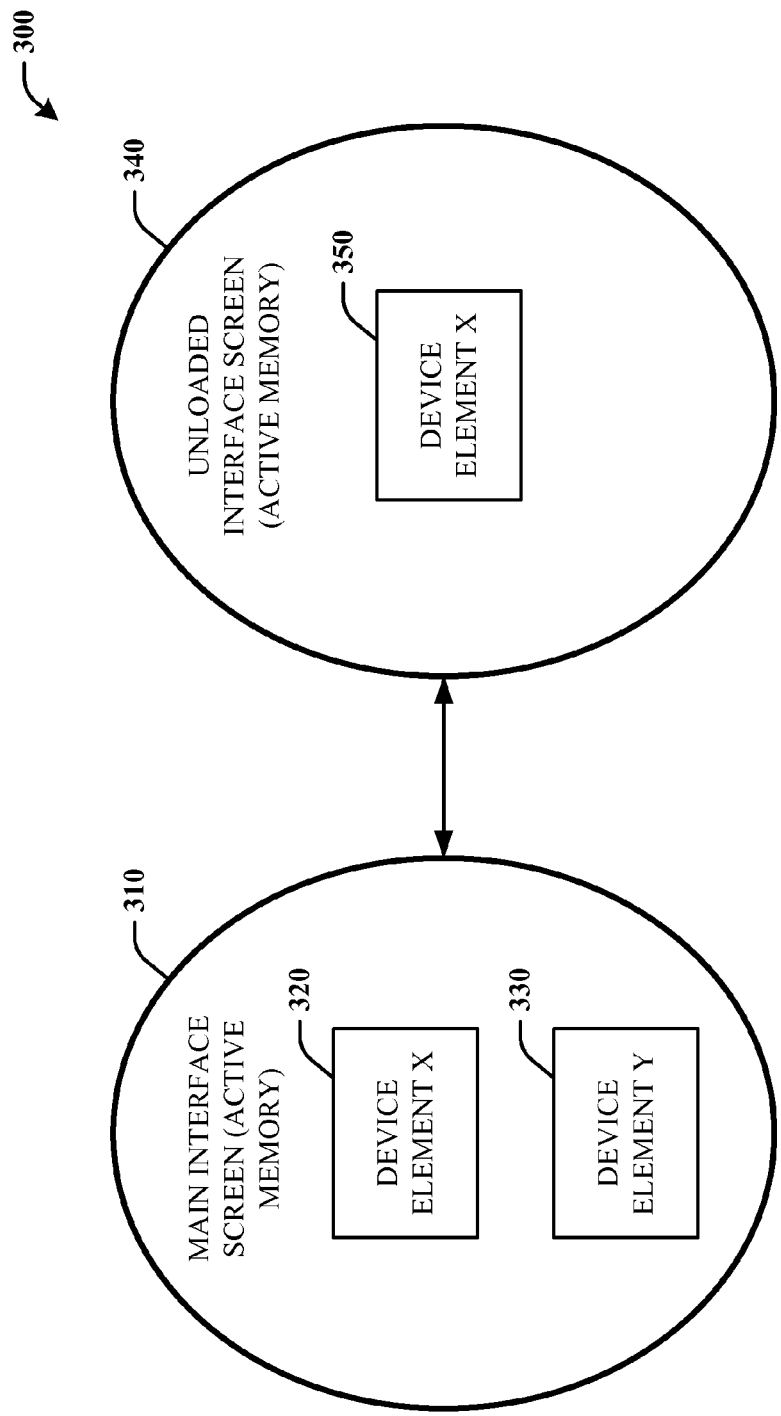
FIG. 3 is a block diagram of an interface device unloading system.

In view of FIG. 3, a block diagram of an interface device unloading system 300 that conserves memory and optimizes overall efficiency is depicted. As indicated in this example, the main interface screen 310 incorporates device element X 320 and device element Y 330 (e.g., all device elements that support the interface device), while the unloaded interface screen 340 incorporates just device element X 350 (e.g., eliminating device element Y 330 that was not required for continuous operation of the interface device).

The main interface screen 310 maintains a global container of all initial device elements, while the unloaded interface screen maintains only the aspects necessary for the present view. Display properties (e.g., color, location, size, and text) can represent one aspect of a visual representation. Functional properties (e.g., count, interval, time, and reset) can represent another aspect of a visual representation. For example, this situation applies when a graphical view of a clock remains at 1:00 PM for 59 seconds until it turns into 1:01 PM. Although the functional features of the clock must be retained in order to keep track of the time, the visual features of the clock are constant for these 59 seconds. Therefore, the visual features of the clock do not need to be implemented again during the time period and can be temporarily unloaded from memory.

In one example, the main interface screen 310 comprises all device elements, which in this case are device element X 320 and device element Y 330. The main interface screen 310 is a display of a graphical clock that represents the current time, e.g., 1:00 PM. Device element X 320 incorporates the functional aspect of keeping track of the time, while device element Y 330 incorporates the visual aspect of graphically presenting the time. The unloaded interface screen 340 represents a subsequent view of the interface device, e.g., a few seconds after 1:00 PM. Since the visual aspect that displays 1:00 PM remains the same until 1:01 PM, device element Y 330 is unloaded from memory, but device element X 350 must be maintained to keep track of the progressing time. While an unloaded device element is temporarily removed from memory, that device element still remains instantiated and active.

In another example, device element Y 330 is not fully unloaded from memory, but partially suppressed. In this situation, device element Y 330 is only partially maintained as necessary in the unloaded interface screen 340.

By fully or partially unloading unessential device elements from active memory, overall system performance improves. Memory conservation allows use of available memory space to be efficient, which in turn reduces processing time. Remaining memory can be allocated towards other tasks that may all run concurrently. In addition to memory conservation, transmission of redundant data wastes network resources and may impede network traffic flow. Such benefits with respect to memory and network traffic conservation apply to device element mirroring as well.

Figure 4:
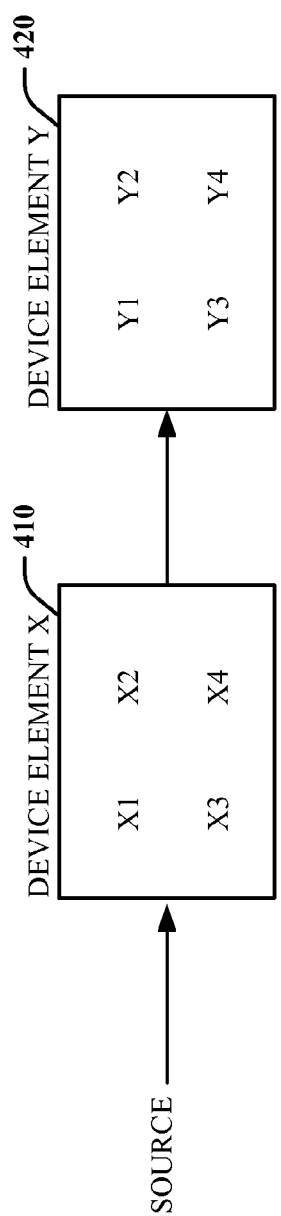
FIG. 4 is a block diagram of a device element mirroring system.

FIG. 4 illustrates a block diagram of a device element mirroring system 400, another approach to memory conservation and optimization. As an example, the device element mirroring system 400 comprises a representative device element X 410 with properties (X1-X4) that are mirrored by device element Y 420 (Y1-Y4). The properties of device element X 410 correspond with the properties of device element Y 420 (e.g., X1 and Y1 represent a color attribute, X2 and Y2 represent a location attribute, X3 and Y3 represent a size attribute, and X4 and Y4 represent a text attribute).

Device element X 410 and device element Y 420 may each act individually upon shared data. If device element X 410 and device element Y 420 have identical or related attributes, device element mirroring may be used to conserve memory and improve performance without sharing properties. Device element mirroring enables more flexible operation than property sharing. While property sharing requires multiple device elements to point to a single shared attribute, device element mirroring efficiently and selectively transmits necessary data from one device element to one or more other device elements. The transfer of signals between device elements can be based on events that are manual or automatic in nature. A manual event is one that is directed by forced input from a user (e.g., a command entered by the click of a mouse). An automatic event is one that is based on circumstances unique to a situation (e.g., a detection of a dangerous condition that automatically triggers a warning message).

For example, device element X 410 comprises four properties, X1, X2, X3, and X4, which represent the color, location, size, and text, respectively. Device element Y 420 comprises its own four properties, Y1, Y2, Y3, and Y4, which correspond to the same category types as those found in device element X 410. Device element X 410 receives data from a source. This data communicates a warning message, which triggers a change in X1, the color property, of device element X 410 from green to red. The property change of X1 in device element X 410 triggers device element mirroring in device element Y 420 to change its color property, Y1, from green to red as well.

Device element mirroring of device element Y 420 from device element X 410 does not necessarily require that device element Y 420 mirror an identical or analogous property of device element X 410. For instance, color property X1's change from green to red can trigger text property Y4's change from "GO" to "STOP"—in addition to (or instead of) the Y1 color property change described above.

In another example, the data communicated from the source to device element X 410 can trigger device element mirroring. Rather than wait for a property change in device element X 410, device element Y 420 may initiate the mirroring function upon indication that device element X 410 has received the appropriate data from the source. For example, color property Y1 can be set to always match color property X1, regardless of what color it is or what type of data was triggered at the source.

Figure 5:
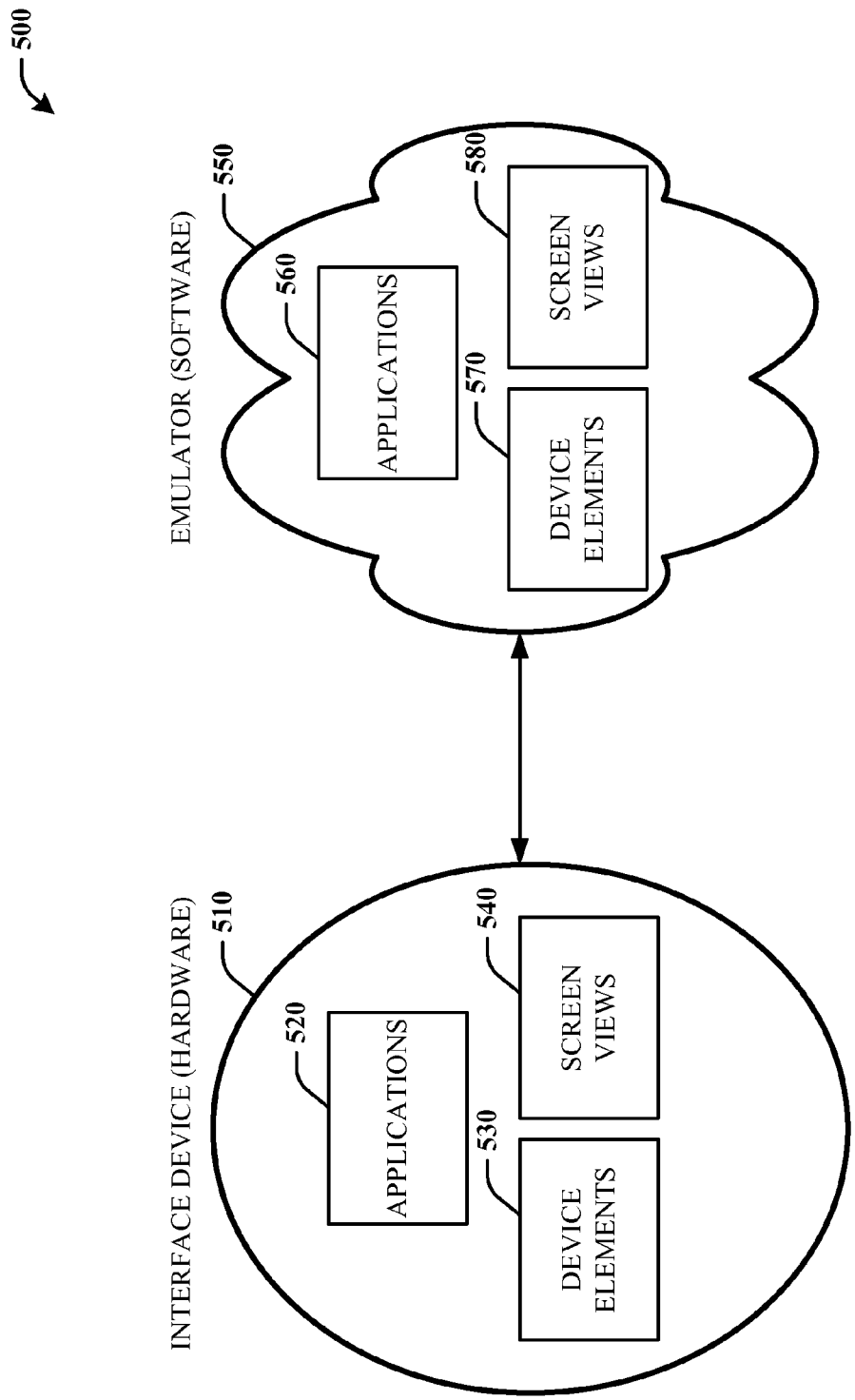
FIG. 5 is a block diagram of an emulation system.

As depicted in FIG. 5, a block diagram of an emulation system 500 for software mimicking of a hardware implementation is represented. The emulation system 500 comprises a hardware interface device 510, containing full-scale applications 520, device elements 530, and screen views 540, and a software emulator 550, containing the corresponding software instances of the applications 560, device elements 570, and screen views 580. Multiple emulators can be created for a single hardware device, and a single emulator can contain elements extracted from more than one hardware device.

The interface device 510 is a hardware representation of the tool used by an operator to interact with a machine. The interface device 510 is configured with applications 520, device elements 530, and screen views 540 for a user-friendly presentation to the operator. The emulator 550 is a software implementation of the interface device 510. The emulator 550 provides a simple and inexpensive platform to develop, test, and finalize the configuration of an interface device 510 before such implementation occurs on an actual piece of hardware.

The emulator 550 is created by extracting copies of the applications 520, device elements 530, and screen views 540 of the interface device 510. The resulting product is a software version of the hardware device, with fully functional and configurable features. The applications 560, device elements 570, and screen views 580 on the emulator 550 will behave identically to the applications 520, device elements 530, and screen views 540 on the actual interface device 510. For instance, a developer may want to test a heating function that heats a chamber of the machine after an item counter reaches a certain count. The developer may want to reconfigure this feature by adding supplementary functions, such as a rotation task at certain intervals of time. While test procedures in hardware can be expensive and dangerous, troubleshooting problems in the software can be debugged simply by altering the code. The process can be continuously adjusted on the emulator 550 until the full reconfiguration is finalized.

Upon satisfactory completion of the reconfiguration process of the emulator 550, the newly developed features are ready to be transferred to the hardware interface device 510. The applications 560, device elements 570, and screen views 580 on the emulator 550, as modified, are loaded onto the interface device 510 to replace the originally configured applications 520, device elements 530, and screen views 540. The behavior of the interface device 510 has already been mimicked and predicted by the emulator 550, therefore minimizing the more time-consuming hardware implementation and adjustment by a developer.

In view of the exemplary systems illustrated and described above, methodologies that may be implemented in accordance with the embodiments will be better appreciated with reference to the flow charts of FIGS. 6-11. While, for purposes of simplicity of explanation, the methodologies are depicted and described as a series of blocks, it is to be understood and appreciated that the embodiments are not limited by the order of the blocks, as some blocks may, in accordance with an embodiment, occur in different orders and/or concurrently with other blocks from that shown and described herein. Moreover, not all illustrated blocks may be required to implement the methodologies in accordance with the embodiments.

The embodiments may be described in the general context of computer-executable instructions, such as program modules, executed by one or more components. Generally, program modules include routines, programs, objects, data structures, etc., that perform particular tasks or implement particular abstract data types. Typically, the functionality of the program modules may be combined or distributed as desired in various instances of the embodiments.

Figure 6:
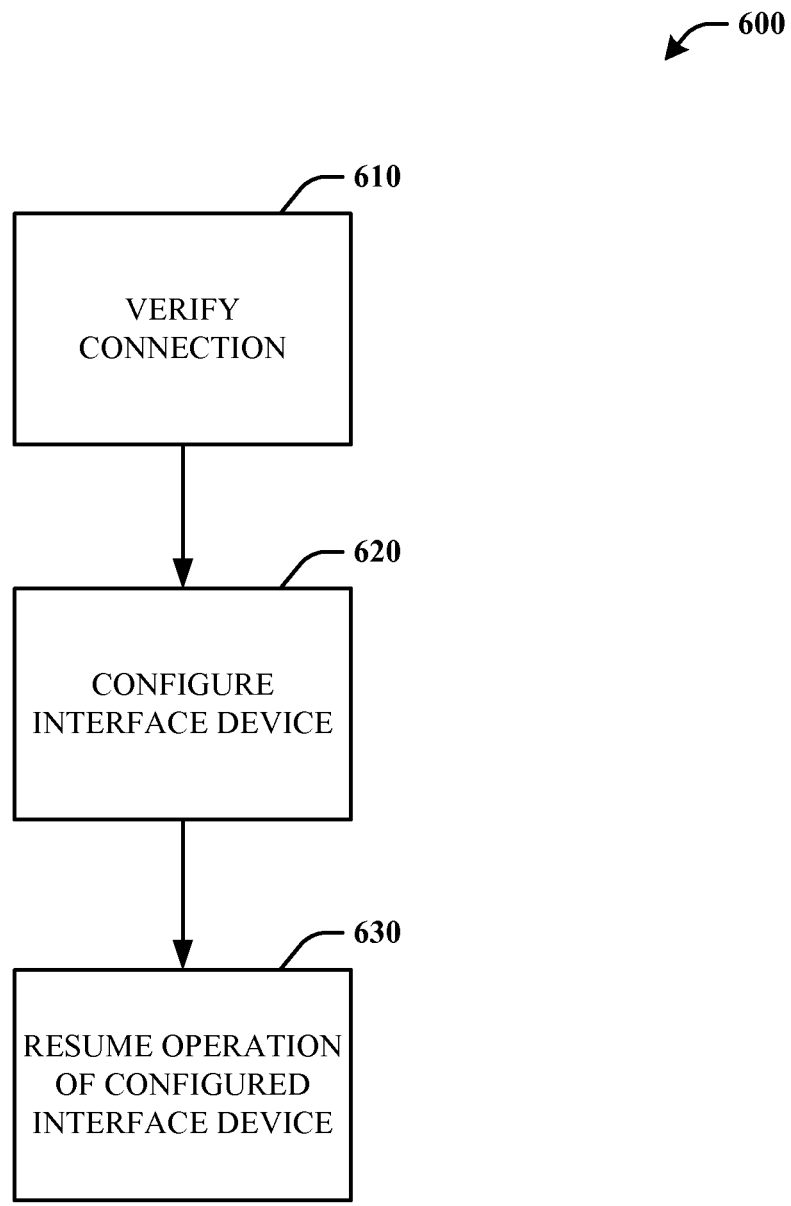
FIG. 6 is a flow diagram of a method of facilitating industrial control.

FIG. 6 illustrates a flow diagram of a method 600 of facilitating industrial control, e.g., configuration or reconfiguration of an interface device. In particular, the method 600 outlines a general process for interface device configuration through instructions from an operator. The method 600 starts by verifying the connection between the configuration station and the interface at 610. Such connection can be a direct connection, an intranet connection, or an Internet connection and can be indicated on the configuration station. Without initial verification of a connection, efforts to transmit and receive data are futile.

Once the connection has been established, at 620, the operator configures the interface device using the configuration station. Configuration of the interface device through its device elements can be performed in a development environment or an operational environment. To support configuration within a development environment, the interface device temporarily pauses the execution of all running processes and allows an operator to freely modify, delete, or add device elements. To support configuration within an operational environment, the interface device's execution process is not interrupted while the operator configures device elements that are not active at the moment. In either environment, configuration is accomplished without using a special program to retrieve and harbor the code using external resources.

If configuration of the interface device is desired in a development environment, display views can be maintained to provide a continuous visual representation of the interface device. In preparation for this view, each device element is first queried to extract its image or equivalent visual representation. Then, these images are collected and stored in a virtual frame buffer or memory display context. Therefore, this content is displayed on a general purpose viewer or browser while the interface device switches from an operational environment to a development environment for device element configuration.

After the interface device is fully configured, operation of the newly configured interface device resumes at 630. If the interface device switched to a configuration mode at 620, the interface device would then switch back to the execution mode after the reconfiguration was complete. If the interface device did not switch to a configuration mode and instead remained in execution mode at 620, transition from configuration to operation of the interface device appears to occur almost uninterrupted.

Figure 7:
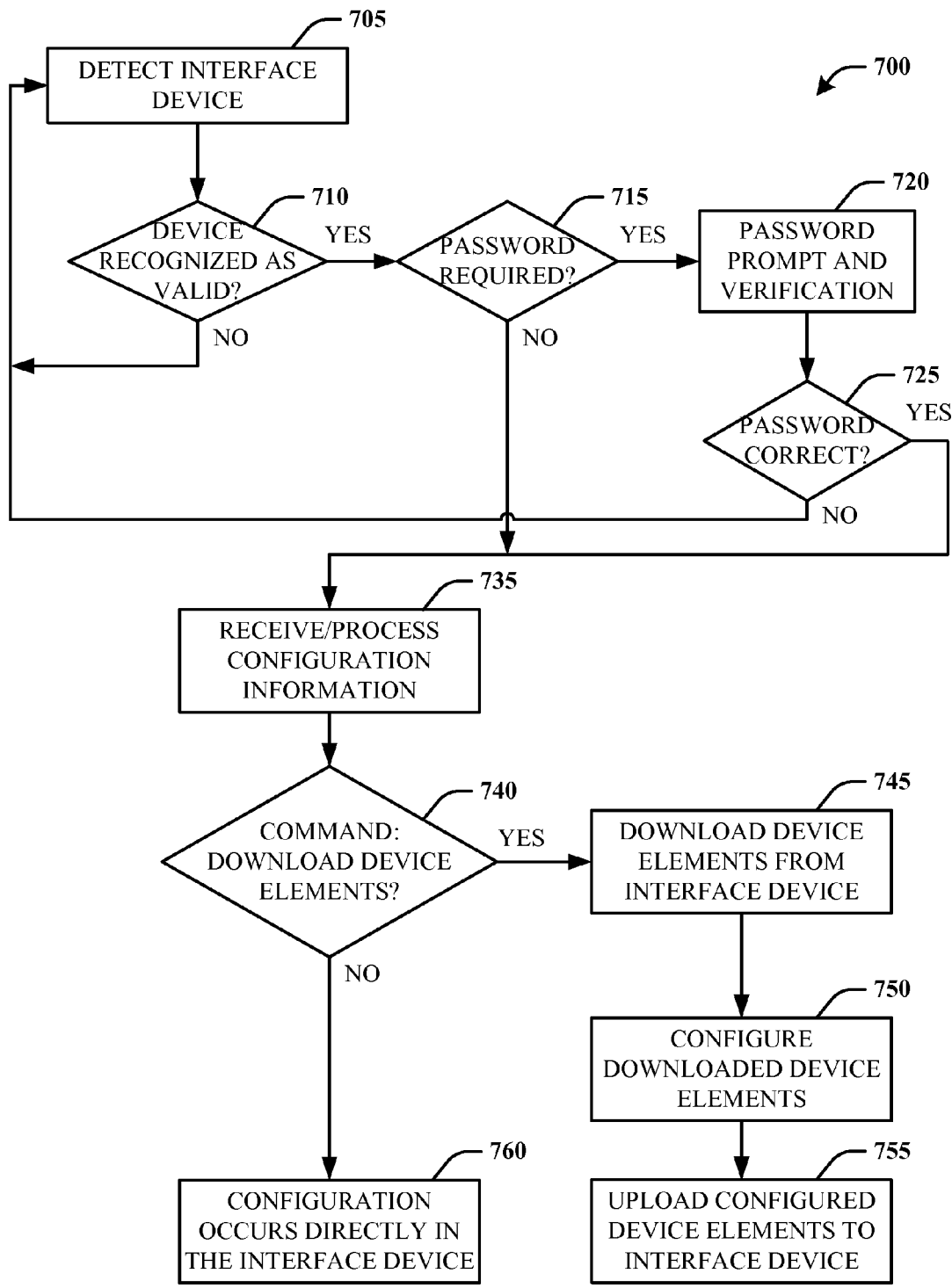
FIG. 7 is another flow diagram of a method of facilitating industrial control.

FIG. 7 is another flow diagram of a method 700 of facilitating industrial control, affording various options in which device elements of an interface device are managed and configured. The method 700 begins by detecting an interface device through a configuration station at 705. The detection can be triggered upon an event or regular or sporadic occurrences. At 710, if the device is recognized as valid and configurable, the method 700 proceeds to determine at 715 whether a password is required for access to the interface device. If a password is required, at 720 the password entered in response to a prompt is verified for accuracy. At 725, if the password is correct, the method 700 continues to 735, where the interface device receives and processes configuration information from the configuration station. If a password is not required at 715, the method 700 immediately proceeds to 735 to receive and process configuration information. In a circumstance where the interface device is not valid and configurable at 710, or where the submitted password is incorrect at 725, the configuration process does not occur.

The configuration of the device elements can occur in the interface device or in the configuration station. At 740, the operator determines whether he would like to download the device elements to the configuration station. If so, the device elements are downloaded from the interface device at 745, configured in the configuration station at 750, and uploaded back to the interface device at 755. At 740, if the operator determines he would not like to download the device elements to the configuration station, at 760, configuration of the device elements occur directly in the interface device.

Regardless of where the configuration occurs (in the interface device or in the configuration station), the connection can be supported by numerous ways. One option is to have a direct link between the configuration station and the interface device. In particular, the configuration station may be housed in the interface device or connected through a direct line. In the alternative, the configuration station may access the interface device remotely with a browser, enabling one or more operators to view the configuration station from any computer connected to the intranet or Internet.

Figure 8:
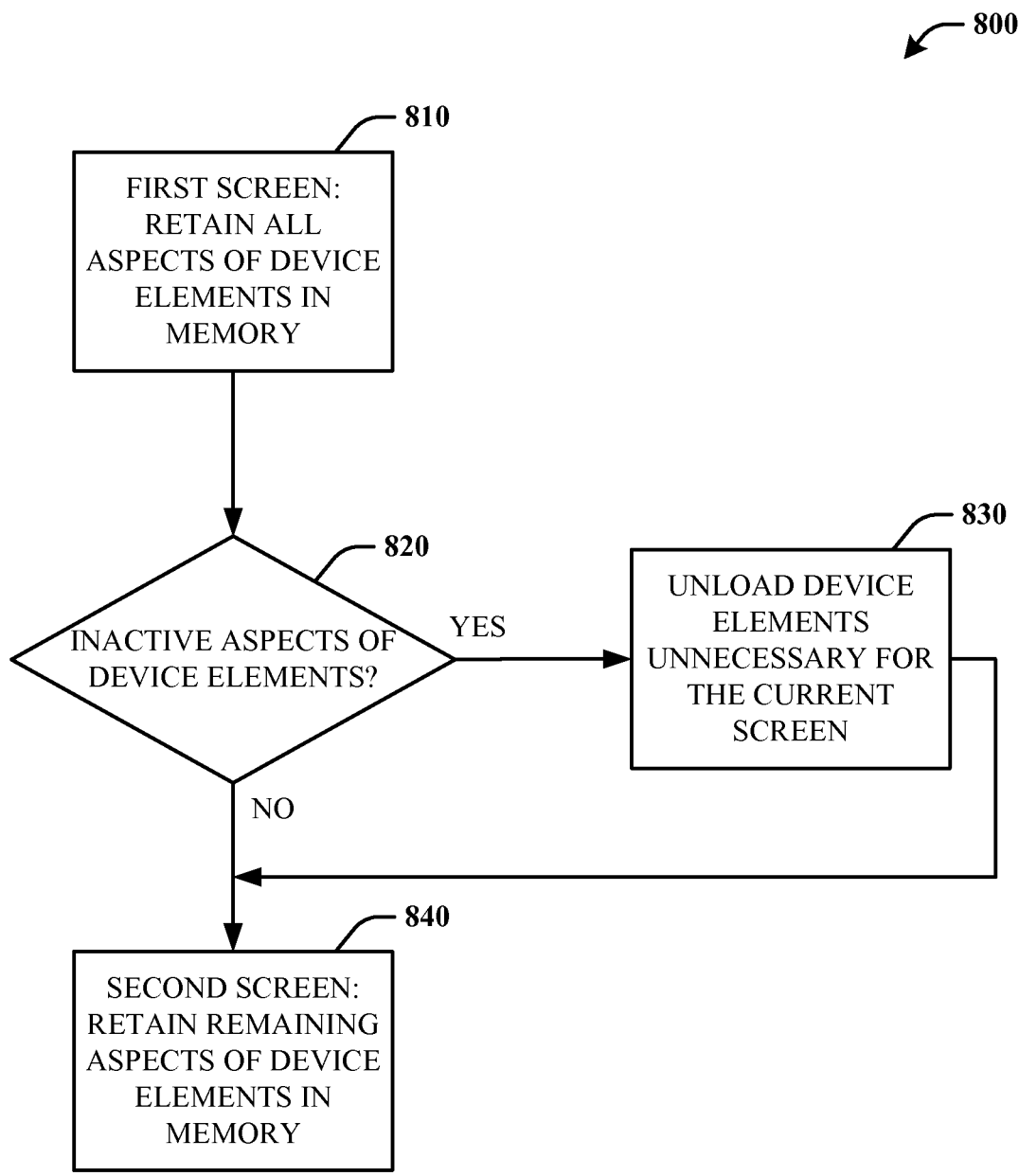
FIG. 8 is a flow diagram of a method of facilitating an unloading module.

FIG. 8 illustrates a flow diagram of a method 800 of facilitating an unloading module that supports memory conservation and efficiency by temporarily removing unessential device elements from active memory. The method 800 starts at 810, in view of an initial interface screen that retains all aspects (visual and operational) of the necessary device elements in a global memory container. For example, the first screen may present a digital temperature display such as 50° F. If the numeric view is set to display only integers, it is irrelevant from the perspective of the display whether the actual temperature is 49.6° F. or 50.2° F. because in either situation (rounded to the nearest one), the appearance remains at 50° F. Before proceeding to the next screen, the method 800 checks for such idle elements at 820. Status checking can occur at regular or random time intervals or can be triggered based on certain events or changes to the interface device.

If there are idle elements, at 830, the interface device temporarily unloads those unnecessary device elements from the global memory container. In the above example, the device elements representing display property features (e.g., font, color, position, and text) is unloaded from memory. The remaining device elements (e.g., features relating to monitoring and measurement of temperature) are retained in memory for the next screen view at 840. In the example discussed above, if the temperature were to rise to 50.2° F., the device elements supporting the screen view would be unloaded, but the device elements supporting the internal monitoring, measuring, and recording of the temperature would be retained so that the interface device contains a current and accurate determination of the actual temperature. Returning to 820, if all device elements are active and required for the subsequent screen, then all device elements are retained in memory at 840.

Figure 9:
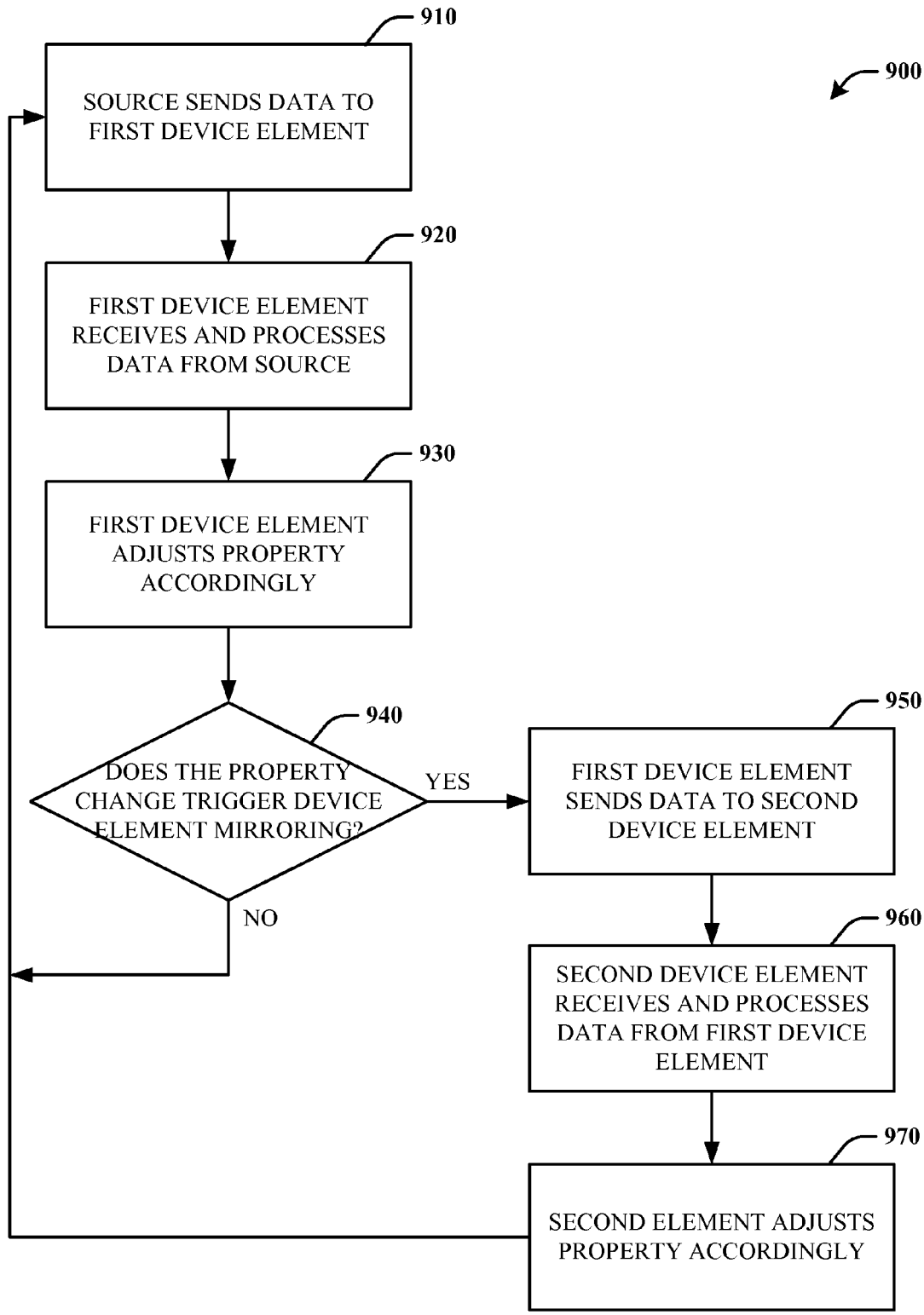
FIG. 9 is a flow diagram of a method of facilitating device element mirroring.

FIG. 9 refers to a flow diagram of a method 900 of facilitating device element mirroring, another option for conserving memory by directly communicating a change between two device elements with an identical or similar property. One device element processes received information relating to a property change and at least one other device element mirrors this change by performing the same or a related change without processing the information again.

To begin, at 910 the source sends data to a first device element. The data indicates an instruction with respect to a setting or changing one or more properties. The first device element receives and processes the data at 920, and adjusts one or more properties according to the processed data at 930. At 940, if the property change triggers device element mirroring, then the first device element sends data indicating the property change to the second device element at 950. The second device element receives and processes this information at 960 and automatically adjusts an identical or related property at 970. The adjustment can occur immediately or after a random or predetermined period of time. Returning to 940, if the first device element's property change does not trigger device element mirroring, then the second device element does not receive further information regarding the present situation.

In addition, device element mirroring may work as a chain, a group, or a combination of the two. As a chain, the second device element may trigger mirroring of another device element, which may trigger mirroring of yet another device element, and so on. As a group, a property change in one device element can trigger the function of multiple device elements that concurrently mirror that device element. In a combination of chain and group process, many device elements can be variously mirrored in a web of interconnections.

Figure 10:
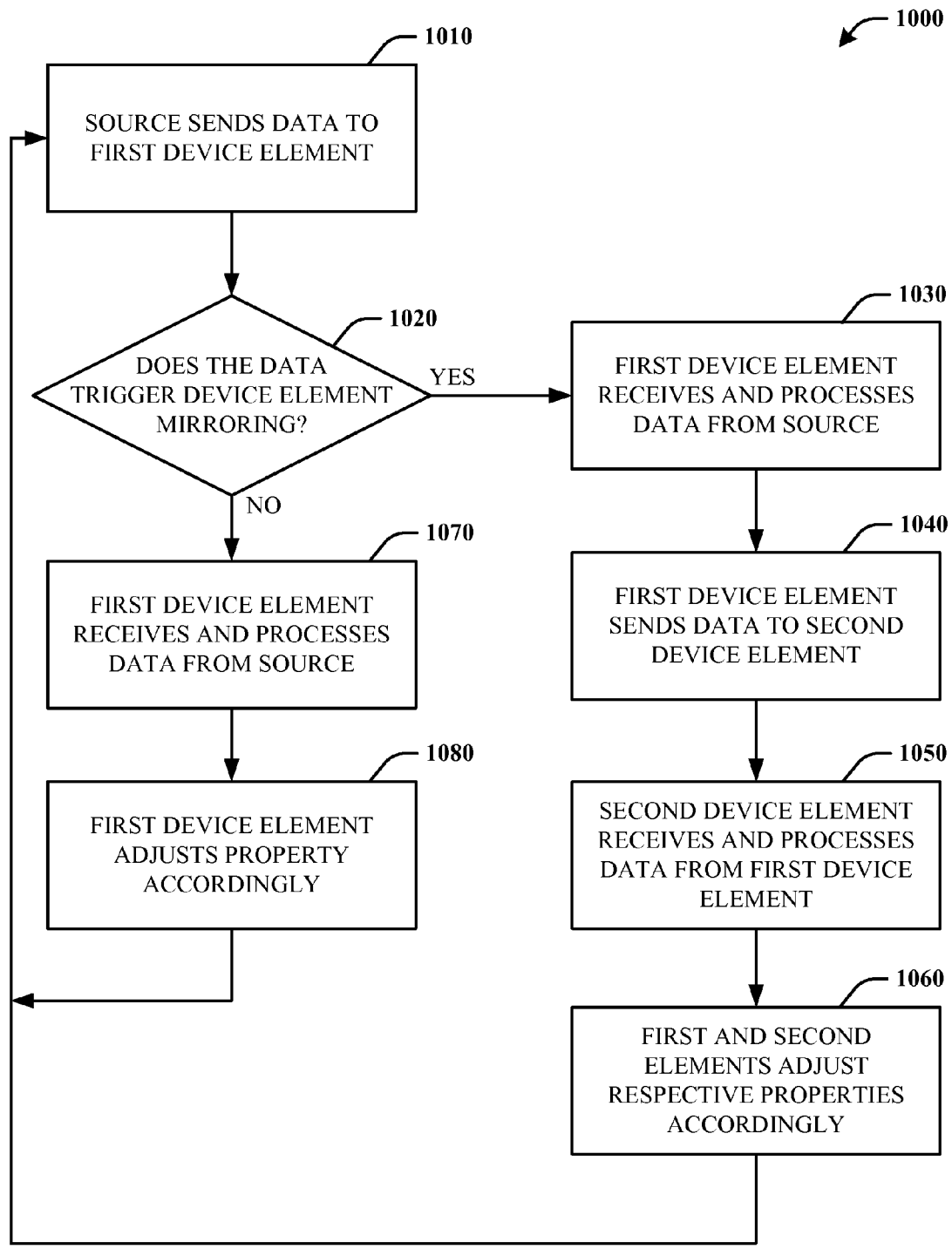
FIG. 10 is another flow diagram of a method of facilitating device element mirroring.

Turning to FIG. 10, another flow diagram of a method 1000 of facilitating device element mirroring based on source-triggering events is presented. In this situation, at 1010, the source sends data to the first device element. The data can originate from an event based on manual or automatic sources. For example, a user can manually submit a command to force device element mirroring. In addition, a detected emergency occurrence can trigger a warning message that necessitates device element mirroring. This data transmission leads to the prompt at 1020 to determine whether device element mirroring is triggered. If so, at 1030, the first device element receives and processes the data from the source. At 1040, the first device element sends data to the second device element and at 1050, the second device element receives and processes the data from the first device element. Finally, at 1060, the first device element and the second device element adjust their respective properties at the same time. In the alternative, the first device element could have adjusted its property at 1050, while the second device element was receiving and processing its data. Yet another option is to hold the adjustment of the first device element's property until after the second device element has completed its adjustment.

Going back to 1020, if the data transmission from the source does not trigger device element mirroring, then at 1070, only the first device element receives and processes the data from the source and at 1080, adjusts its property accordingly. Since device element mirroring is not triggered, the second device element is left alone.

Figure 11:
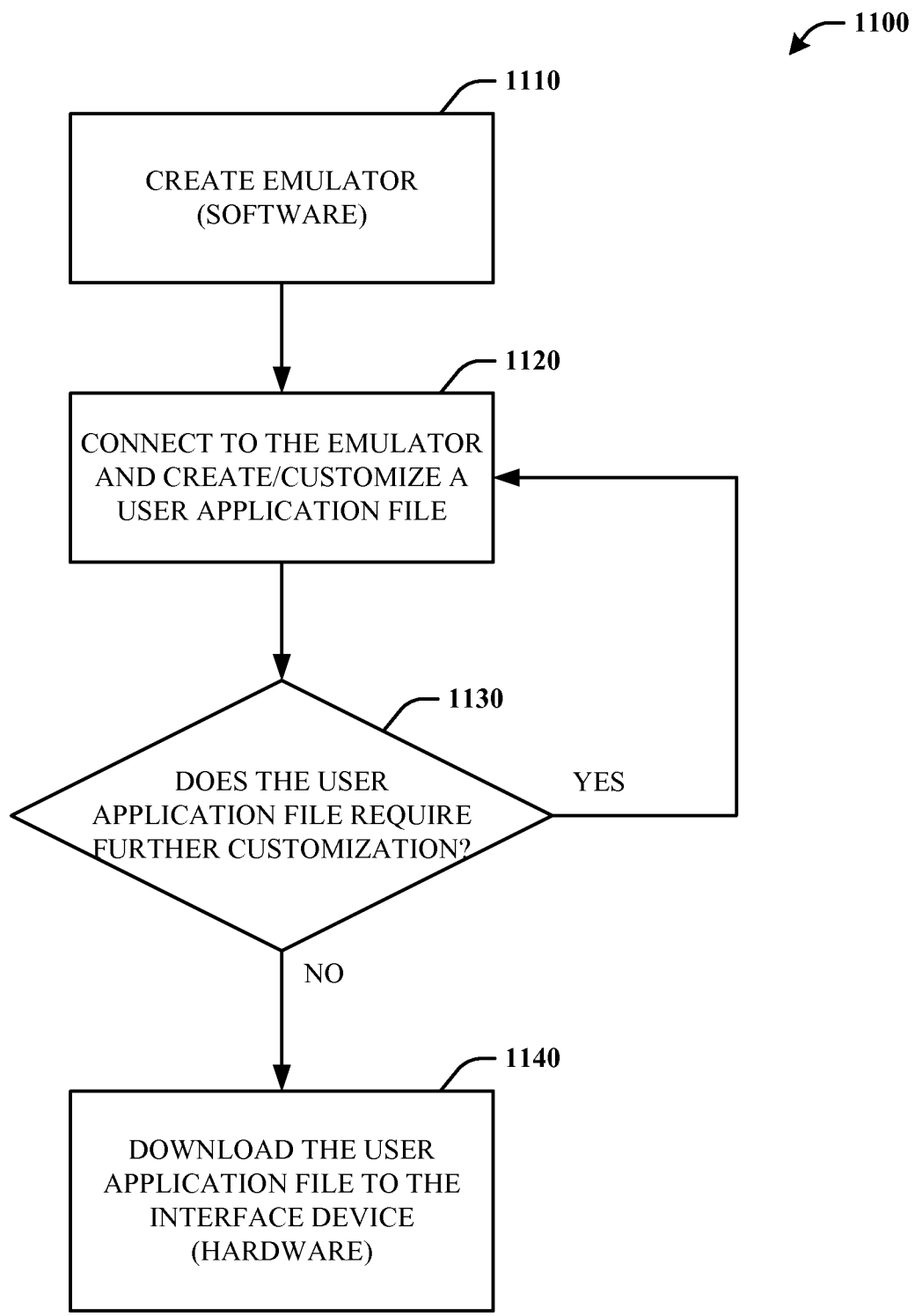
FIG. 11 is a flow diagram of a method of facilitating emulation.

As illustrated, FIG. 11 is a flow diagram of a method 1100 of creating an emulator in order to execute the same firmware on a personal computer as is executed by an interface device. Emulation enables versatile software development of an interface device without committing the configuration to hardware, conserving time and resources. Starting with 1110, an emulator is created by extracting a software copy of the interface device. This copy is a full duplication of the interface device with fully functioning features. At 1120, a user connects to the emulator and creates a user application file on the emulator, which behaves exactly as it would on the actual interface device. The user application file is a template with user-customizable properties. For example, properties can be configured for functionality, accuracy, and user-friendliness. If those properties are not satisfactory, they can be adjusted as necessary. At 1130, if a developer feels that the user application file requires further customization, he may return to 1120 and run test programs and change the code as many times as he wishes. When the user application file is configured to the developer's satisfaction, he may download the user application file to the interface device hardware at 1140.

Figure 12:
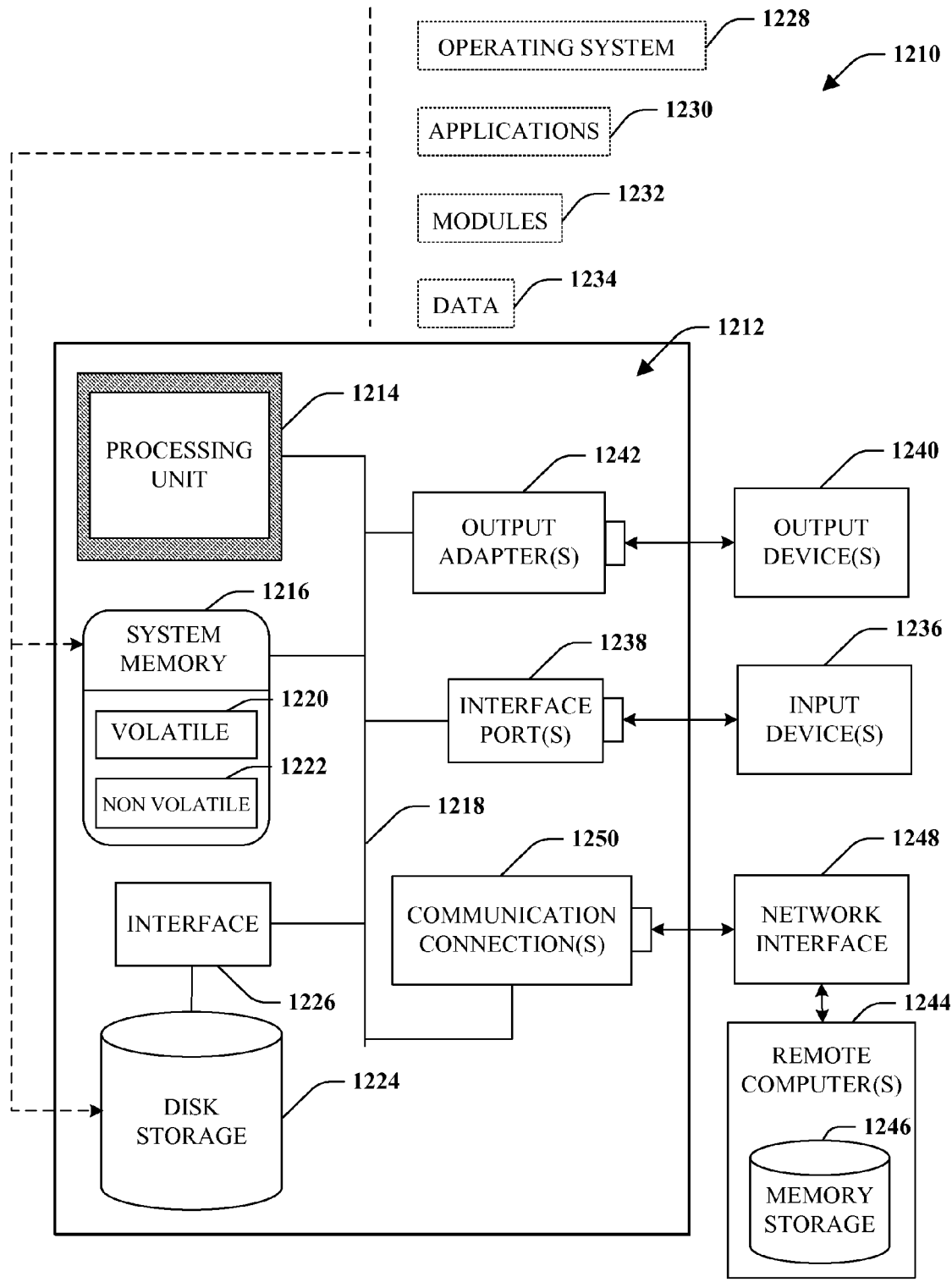
FIG. 12 is a schematic block diagram illustrating a suitable operating environment.
Figure 13:
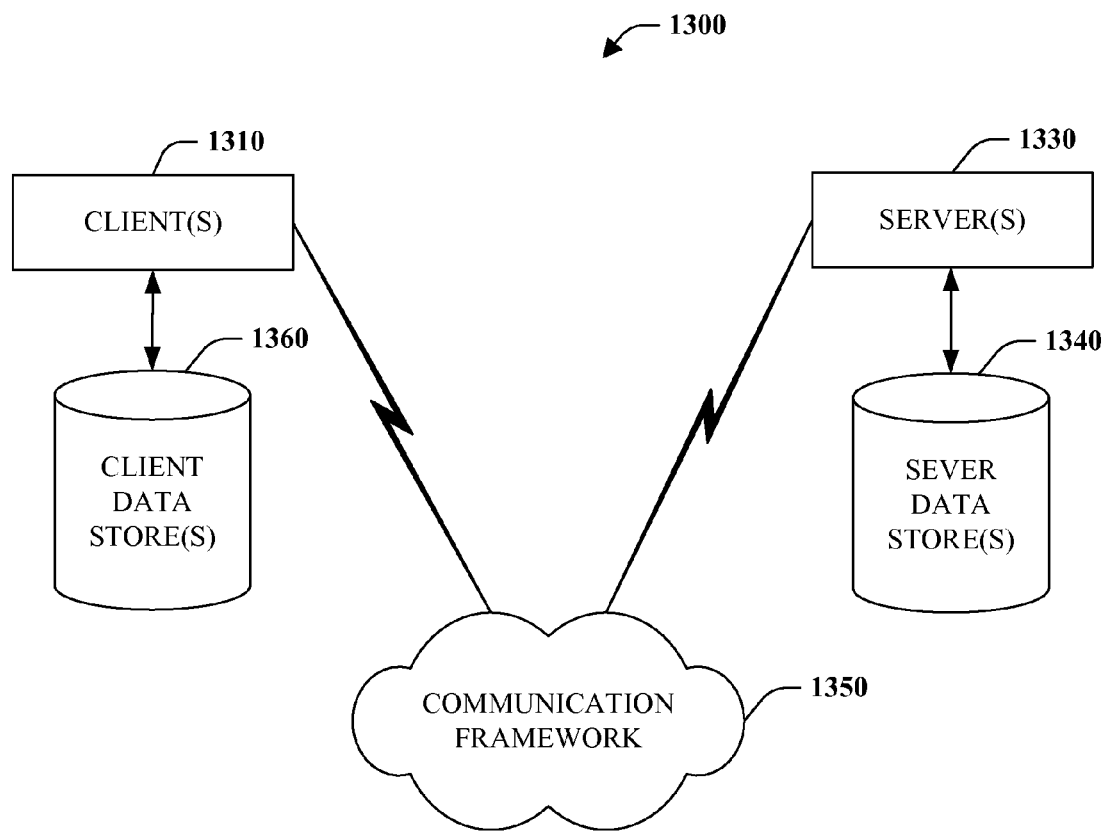
FIG. 13 is a schematic block diagram of a sample-computing environment.

In order to provide a context for the various aspects of the disclosed subject matter, FIGS. 12 and 13 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 12, an exemplary environment 1210 for implementing various aspects disclosed herein includes a computer 1212 (e.g., desktop, laptop, server, hand held, programmable consumer or industrial electronics . . . ). The computer 1212 includes a processing unit 1214, a system memory 1216, and a system bus 1218. The system bus 1218 couples system components including, but not limited to, the system memory 1216 to the processing unit 1214. The processing unit 1214 can be any of various available microprocessors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable ROM (EEPROM), or flash memory. Volatile memory 1220 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1212 also includes removable/non-removable, volatile/non-volatile computer storage media. FIG. 12 illustrates, for example, disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in suitable operating environment 1210. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the present invention can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212 and to output information from computer 1212 to an output device 1240.

Output adapter 1242 is provided to illustrate that there are some output devices 1240 like displays (e.g., flat panel and CRT), speakers, and printers, among other output devices 1240 that require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection(s) 1250. Network interface 1248 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit-switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems, power modems and DSL modems, ISDN adapters, and Ethernet cards or components.

FIG. 13 is a schematic block diagram of a sample-computing environment 1300 with which the present invention can interact. The system 1300 includes one or more client(s) 1310. The client(s) 1310 can be hardware and/or software (e.g., threads, processes, computing devices). The system 1300 also includes one or more server(s) 1330. Thus, system 1300 can correspond to a two-tier client server model or a multi-tier model (e.g., client, middle tier server, data server), amongst other models. The server(s) 1330 can also be hardware and/or software (e.g., threads, processes, computing devices). The servers 1330 can house threads to perform transformations by employing the present invention, for example. One possible communication between a client 1310 and a server 1330 may be in the form of a data packet adapted to be transmitted between two or more computer processes. The system 1300 includes a communication framework 1350 that can be employed to facilitate communications between the client(s) 1310 and the server(s) 1330. The client(s) 1310 are operatively connected to one or more client data store(s) 1360 that can be employed to store information local to the client(s) 1310. Similarly, the server(s) 1330 are operatively connected to one or more server data store(s) 1340 that can be employed to store information local to the servers 1330.

It is to be appreciated that the systems and/or methods of the embodiments can be facilitated with computer components and non-computer related components alike. Further, those skilled in the art will recognize that the systems and/or methods of the embodiments are employable in a vast array of electronic related technologies, including, but not limited to, computers, servers, and/or handheld electronic devices, and the like.

What has been described above includes examples of the embodiments. It is, of course, not possible to describe every conceivable combination of components or methodologies for purposes of describing the embodiments, but one of ordinary skill in the art may recognize that many further combinations and permutations of the embodiments are possible. Accordingly, the subject matter is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An industrial automation system, comprising:
    a memory that stores computer-executable instructions; and
    a processor that facilitates execution of the computer-executable instructions to at least:
        facilitate display of a main interface screen comprising a plurality of device elements stored in a temporary memory;
        check a status of a first device element of the plurality of device elements;
        determine whether to fully unload the first device element from the temporary memory or partially unload the first device element from the temporary memory based upon the status;
        in response to a determination to fully unload the first device element from the temporary memory, fully unload the first device element from the temporary memory; and
        in response to a determination to partially unload the first device element from the temporary memory, partially unload the first device element from the temporary memory.

2. The industrial automation system of claim 1, wherein the processor further facilitates execution of the computer-executable instructions to check the status of the first device element refresh rate.

3. The industrial automation system of claim 1, wherein the processor further facilitates execution of the computer-executable instructions to:
    receive data, from a source, for at least one parameter of the first device element;
    process the data;
    update the at least one parameter of the first device element with the processed data;
    mirror the processed data to at least one identical parameter of a second device element of the plurality of device elements.

4. A method, comprising:
    displaying, by a system including a processor, a main interface screen comprising a plurality of device elements stored in an active memory;
    checking, by the system, status of a first device element of the plurality of device elements;

determining whether to fully unload the first device element from the active memory or partially unload the first device element from the active memory based upon the status;

in response to a determination to fully unload the first device element from the active memory, fully unloading, by the system, the first device element from the active memory; and in response to a determination to partially unload the first device element from the active memory, partially unloading, by the system from the active memory, the first device element.

5. The method of claim 4, wherein the checking further comprises checking, by the system, the status of the first device element at a time interval.

6. The method of claim 4, further comprising
receiving, by the system, an operator request to configure a device element with a status of idle; and
facilitating, by the system, configuration of the device element with the status of idle.

7. The method of claim 4, wherein the plurality of device elements further comprise at least one of an adjustable attribute property, an executable function, a connection link to other device elements, or a communications interface.

8. The method of claim 4, wherein the plurality of device elements further comprise object oriented components.

9. The method of claim 4, further comprising:
receiving, by the system including a processor, data from a source for at least one parameter of the first device element;
processing, by the system, the data;
updating, by the system, the at least one parameter of the first device element with the processed data;
mirroring, by the system, the processed data to at least one identical parameter of a second device element of the plurality of device elements.

10. The system of claim 1, wherein the plurality of device elements represent display operations, monitoring operations or control operations.

11. A non-transitory computer-readable medium having instructions stored thereon that, in response to execution, cause a system including a processor to perform operations comprising:
displaying a main interface screen comprising a plurality of device elements stored in a temporary memory;
checking status of a first device element of the plurality of device elements;
determining whether to fully unload the first device element from the active memory or partially unload the first device element from the active memory based upon the status;
in response to a determination to fully unload the first device element from the temporary memory, fully unloading the first device element from the temporary memory; and
in response to a determination to partially unload the first device element from the temporary memory, partially unloading the first device element from the temporary memory.

12. The non-transitory computer-readable medium of claim 11, wherein the checking the status of the first device element is based on a refresh rate.

13. The non-transitory computer-readable medium of claim 11, wherein the operations further comprise:
receiving data from a source for at least one parameter of the first device element;
processing the data;
updating the at least one parameter of the first device element with the processed data;
mirroring the processed data to at least one identical parameter of a second device element of the plurality of device elements.

* * * * *